US012073588B2

(12) United States Patent
Parchami et al.

(10) Patent No.: US 12,073,588 B2
(45) Date of Patent: Aug. 27, 2024

(54) NEURAL NETWORK OBJECT POSE DETERMINATION

(71) Applicant: Ford Global Technologies, LLC, Dearborn, MI (US)

(72) Inventors: Mostafa Parchami, Ann Arbor, MI (US); Enrique Corona, Canton, MI (US); Kunjan Singh, Ann Arbor, MI (US); Gaurav Pandey, College Station, TX (US)

(73) Assignee: Ford Global Technologies, LLC, Dearborn, MI (US)

(*) Notice: Subject to any disclaimer, the term of this patent is extended or adjusted under 35 U.S.C. 154(b) by 410 days.

(21) Appl. No.: 17/484,159

(22) Filed: Sep. 24, 2021

(65) Prior Publication Data

US 2023/0145701 A1 May 11, 2023

(51) Int. Cl.
*G06T 7/80* (2017.01)
*G06N 3/04* (2023.01)
(Continued)

(52) U.S. Cl.
CPC .............. *G06T 7/80* (2017.01); *G06N 3/04* (2013.01); *G06T 7/75* (2017.01); *G06V 30/194* (2022.01);
(Continued)

(58) Field of Classification Search
CPC ......... G06T 7/80; G06T 7/75; G06T 2200/08; G06T 2207/20081; G06T 2207/20084;
(Continued)

(56) References Cited

U.S. PATENT DOCUMENTS 9,862,318 B2   1/2018  Lessmann et al.
10,769,793 B2 * 9/2020  Chen .................. B60W 60/001
(Continued)

OTHER PUBLICATIONS

Fang et al., "3D Bounding Box Estimation for Autonomous Vehicles by Cascaded Geometric Constraints and Depurated 2D Detections Using 3D Results", IEEE Transactions on Magnetics, Sep. 1, 2019 (Year: 2019).*
(Continued)

*Primary Examiner* — Matthew C Bella
*Assistant Examiner* — Janice E. Vaz
(74) *Attorney, Agent, or Firm* — Frank A. MacKenzie; Bejin Bieneman PLC

(57) ABSTRACT

A camera is positioned to obtain an image of an object. The image is input to a neural network that outputs a three-dimensional (3D) bounding box for the object relative to a pixel coordinate system and object parameters. Then a center of a bottom face of the 3D bounding box is determined in pixel coordinates. The bottom face of the 3D bounding box is located in a ground plane in the image. Based on calibration parameters for the camera that transform pixel coordinates into real-world coordinates, a) a distance from the center of the bottom face of the 3D bounding box to the camera relative to a real-world coordinate system and b) an angle between a line extending from the camera to the center of the bottom face of the 3D bounding box and an optical axis of the camera are determined. The calibration parameters include a camera height relative to the ground plane, a camera focal distance, and a camera tilt relative to the ground plane. A six degree-of-freedom (6DoF) pose for the object is determined based on the object parameters, the distance, and the angle.

20 Claims, 16 Drawing Sheets

(51) Int. Cl.
*G06T 7/73* (2017.01)
*G06V 30/194* (2022.01)

(52) U.S. Cl.
CPC ............... *G06T 2200/08* (2013.01); *G06T 2207/20081* (2013.01); *G06T 2207/20084* (2013.01); *G06T 2207/30252* (2013.01); *G06T 2210/12* (2013.01)

(58) Field of Classification Search
CPC ....... G06T 2207/30252; G06T 2210/12; G06T 7/70; G06T 7/536
See application file for complete search history.

(56) References Cited

U.S. PATENT DOCUMENTS

| | | |
|---|---|---|
| 2020/0082180 A1 | 3/2020 | Wang |
| 2021/0134000 A1 | 5/2021 | Malisiewicz et al. |
| 2021/0209797 A1* | 7/2021 | Lee .................... G06T 17/00 |
| 2023/0029900 A1* | 2/2023 | Goel .................. G06V 20/64 |

OTHER PUBLICATIONS

T. Zhe, L. Huang, Q. Wu, J. Zhang, C. Pei and L. Li, "Inter-Vehicle Distance Estimation Method Based on Monocular Vision Using 3D Detection," in IEEE Transactions on Vehicular Technology, vol. 69, No. 5, pp. 4907-4919, May 2020, doi: 10.1109/TVT.2020.2977623 (Year: 2020).*

Fang et al., "3D Bounding Box Estimation for Autonomous Vehicles by Cascaded Geometric Constraints and Depurated 2D Detections Using 3D Results", IEEE Transactions on Magnetics (Year: 2019).*

Fang et al., "3D Bounding Box Estimation for Autonomous Vehicles by Cascaded Geometric Constraints and Depurated 2D Detections Using 3D Results", IEEE Transactions on Magnetics, Sep. 1, 2019.

Sun et al., "Deep High-Resolution Representation Learning for Human Pose Estimation", IEEE Conference on Computer Vision and Pattern Recognition (CVPR 2019).

Yu et al., "Deep Layer Aggregation", Computer Vision Foundation, 2018 IEEE Conference on Computer Vision and Pattern Recognition.

Zhou et al., "Objects as Points", arXiv:1904.07850v2 [cs.CV] Apr. 25, 2019.

* cited by examiner

NEURAL NETWORK OBJECT POSE DETERMINATION

BACKGROUND

Deep neural networks can be trained to perform a variety of computing tasks. For example, neural networks can be trained to extract data from images. Data extracted from images by deep neural networks can be used by computing devices to operate systems including vehicles, robots, security, product manufacturing and product tracking. Images can be acquired by sensors included in a system and processed using deep neural networks to determine data regarding objects in an environment around a system. Operation of a system can rely upon acquiring accurate and timely data regarding objects in a system's environment.

DETAILED DESCRIPTION

Figure 1:
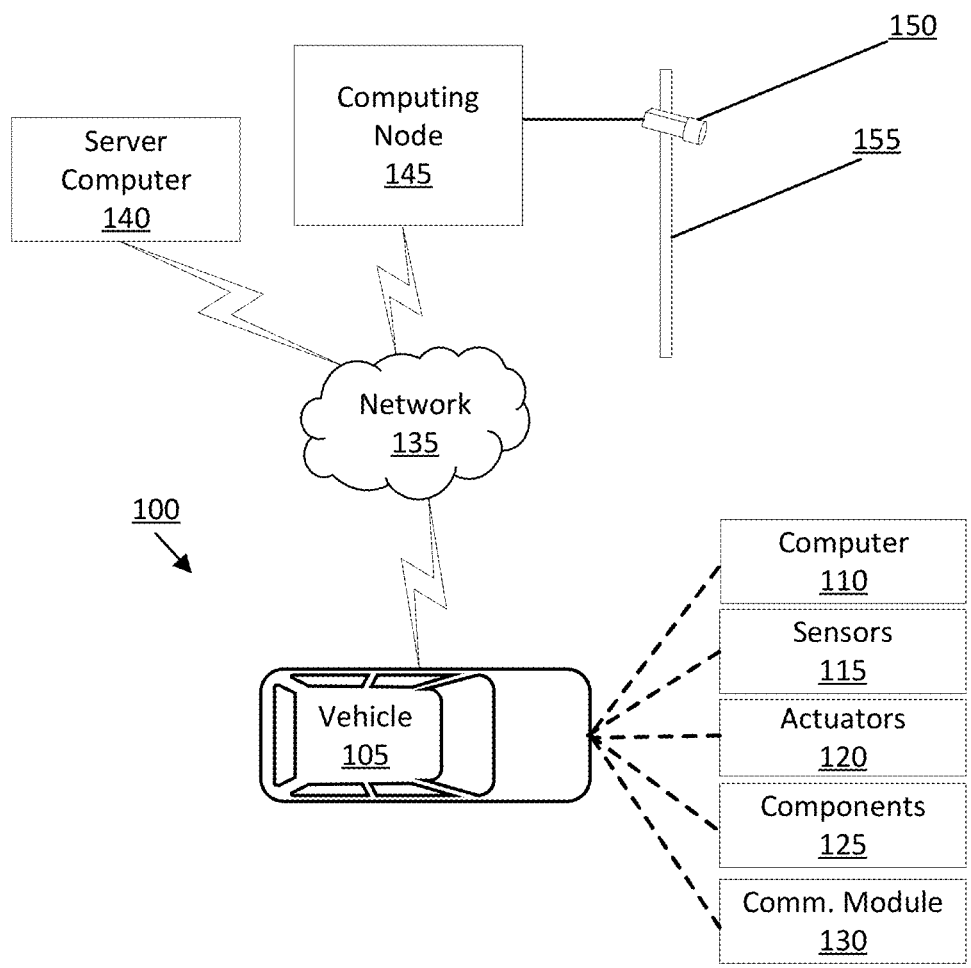
FIG. 1 is a diagram of an example object detection system.

A computer in an object detection system can be programmed to determine objects in image data acquired by sensors in systems including vehicle guidance, robot operation, security, manufacturing, product tracking, etc. Vehicle guidance can include operation of vehicles in autonomous or semi-autonomous modes in environments that include a plurality of objects. Robot guidance can include guiding a robot end effector, for example a gripper, to pick up a part and orient the part for assembly in an environment that includes a plurality of parts. Security systems include features where a computer acquires video data from a camera observing a secure area to provide access to authorized users and detect unauthorized entry in an environment that includes a plurality of users. In a manufacturing system, an object detection system can determine the location and orientation of one or more parts in an environment that includes a plurality of parts. In a product tracking system, an object detection system can determine a location and orientation of one or more packages in an environment that includes a plurality of packages.

Vehicle guidance will be described herein as a non-limiting example of using an object detection system to detect objects, for example, vehicles, in a traffic scene and determine trajectories. For example, a computer in an object detection system can be programmed to acquire data regarding six degree-of-freedom poses (6DoF) of objects on a roadway. An object detection system can acquire data from a variety of sensors to determine the 6DoF poses of objects, including vehicles. For example, an object detection system can acquire data from doppler radar regarding the location of objects. An object detection system can also acquire point cloud data from lidar sensors. The point cloud data can be processed to determine the location of objects. Time series stereo image data can be processed to yield locations for objects in a field of view of the stereo cameras. Time series data can be obtained from stereo video cameras.

Techniques discussed herein improve upon radar, lidar, and stereo camera techniques for determining data regarding objects by determining the 6DoF poses of objects using a single camera. Techniques discussed herein can determine 6DoF poses of objects using a single image sensor that is more efficient, in terms of both money and computational resources, than two stereo image sensors, less than a radar sensor and much, much less than a lidar sensor. Radar sensor typically require correlation with other sensors, such as cameras, to determine object location. Stereo image sensors depend upon two cameras at separate locations maintaining precise orientation to provide accurate data. Lidar sensors are computationally very expensive, i.e., lidar data typically requires more computer memory and processing power to be interpreted and used that data form other sensors, such as cameras. Techniques discussed herein can use a single video camera to acquire image data that can be processed to determine 6DoF poses of objects more efficiently using fewer computing resources than other techniques.

A system includes a computer and a camera positioned to obtain an image of an object. The computer includes a processor and a memory, the memory storing instructions executable by the processor to input the image to a neural network that outputs a three-dimensional (3D) bounding box for the object relative to a pixel coordinate system and object parameters. The instructions further include instructions to then determine a center of a bottom face of the 3D bounding box in pixel coordinates. The bottom face of the 3D bounding box is located in a ground plane in the image. The instructions further include instructions to, based on calibration parameters for the camera that transform pixel coordinates into real-world coordinates, determine a) a distance from the center of the bottom face of the 3D bounding box to the camera relative to a real-world coordinate system and b) an angle between a line extending from the camera to the center of the bottom face of the 3D bounding box and an optical axis of the camera. The calibration parameters include a camera height relative to the ground plane, a camera focal distance, and a camera tilt relative to the ground plane. The instructions further include instructions to determine a six degree-of-freedom (6DoF) pose for the object based on the object parameters, the distance, and the angle.

The instructions can further include instructions to, upon determining an intersection between a first line extending through a vanishing point for the camera and the center of the bottom face and a second line extending along a bottom boundary of the image, determine a first distance, relative to the real-world coordinate system, from the center of the bottom face to the intersection. The instructions can further include instructions to determine a second distance, relative to the real-world coordinate system, from the intersection to the optical axis of the camera. The instructions can further include instructions to determine the distance and the angle based on the first and second distances.

The instructions can further include instructions to determine the first distance based on a distance, in pixels, from the vanishing point to the center of the bottom face, a distance, in pixels, from the vanishing point to the intersection, and the calibration parameters.

The instructions can further include instructions to determine the first distance based additionally on a projection angle between the optical axis of the camera and the first line.

The instructions can further include instructions to determine the second distance based on pixel coordinates of the intersection and measuring fiducials.

The instructions can further include instructions to determine the calibration parameters based on a calibration image including a calibration pattern located parallel to and coincident with the ground plane.

The 6DoF pose can be determined in coordinates of the real-world coordinate system based on orthogonal x, y, and z axes and roll, pitch, and yaw rotations about the x, y, and z axes, respectively.

The object parameters can include at least one of dimensions, a two-dimensional bounding box, and an orientation relative to the camera.

The computer and the camera can be remote from a vehicle. The instructions can further include instructions to provide the 6DoF pose for the object to a second computer in the vehicle. The system can include the second computer including a second processor and a second memory, the second memory storing instructions executable by the second processor to operate the vehicle based on the 6DoF pose for the object. The object can be the vehicle.

A method includes obtaining, via a camera, an image including an object. The method further includes inputting, via a computer, an image to a neural network that outputs a three-dimensional (3D) bounding box for the object relative to a pixel coordinate method and object parameters. The method further includes determining a center of a bottom face of the 3D bounding box in pixel coordinates. The bottom face of the 3D bounding box is located in a ground plane in the image. The method further includes, based on calibration parameters for the camera that transform pixel coordinates into real-world coordinates, determining a) a distance from the center of the bottom face of the 3D bounding box to the camera relative to a real-world coordinate method and b) an angle between a line extending from the camera to the center of the bottom face of the 3D bounding box and an optical axis of the camera. The calibration parameters include a camera height relative to the ground plane, a camera focal distance, and a camera tilt relative to the ground plane. The method further includes determining a six degree-of-freedom (6DoF) pose for the object based on the object parameters, the distance, and the angle.

The method can further include, upon determining an intersection between a first line extending through a vanishing point for the camera and the center of the bottom face and a second line extending along a bottom boundary of the image, determining a first distance, relative to the real-world coordinate system, from the center of the bottom face to the intersection. The method can further include determining a second distance, relative to the real-world coordinate system, from the intersection to the optical axis of the camera. The method can further include determining the distance and the angle based on the first and second distances.

The method can further include determining the first distance based on a distance, in pixels, from the vanishing point to the center of the bottom face, a distance, in pixels, from the vanishing point to the intersection, and the calibration parameters.

The method can further include determining the first distance based additionally on a projection angle between the optical axis of the camera and the first line.

The method can further include determining the second distance based on pixel coordinates of the intersection and measuring fiducials.

The method can further include determining the calibration parameters based on a calibration image including a calibration pattern located parallel to and coincident with the ground plane.

The computer and the camera can be remote from a vehicle. The method can further include providing the 6DoF pose for the object to a second computer in the vehicle. The method can further include operating, at the second computer, the vehicle based on the 6DoF pose for the object. The object can be the vehicle.

Further disclosed herein is a computing device programmed to execute any of the above method steps. Yet further disclosed herein is a computer program product, including a computer readable medium storing instructions executable by a computer processor, to execute an of the above method steps.

With reference to FIGS. 1-14, an example object detection system 100 includes a vehicle 105 and a remote computing node 145 having a camera 150 positioned to obtain an image 1100 of an object 1102. A vehicle computer 110 in the vehicle 105 receives data from sensors 115. The vehicle computer 110 is programmed to operate the vehicle 105 using respective six degree-of-freedom (6DoF) poses 1308 for objects 1102 received from the remote computing node 145, as discussed below.

To determine a 6DoF pose 1308 for an object 1102, the remote computing node 145 is programmed to input the image 1100 to a neural network 1500 that outputs a three-dimensional (3D) bounding box 1400 for the object 1102 relative to a pixel coordinate system and object parameters 1302. The remote computing node 145 is further programmed to then determine a center 1404 of a bottom face 1402 of the 3D bounding box 1400 in pixel coordinates. The bottom face 1402 of the 3D bounding box 1400 is located in a ground plane 404 in the image 1100. The remote computing node 145 is further programmed to, based on calibration parameters for the camera 150 that transform pixel coordinates into real-world coordinates, determine a) a distance D from the center 1404 of the bottom face 1402 of the 3D bounding box 1400 to the camera 150 relative to a real-world coordinate system and b) an angle θ between a line extending from the camera 150 to the center 1404 of the bottom face 1402 of the 3D bounding box 1400 and an optical axis of the camera 150. The calibration parameters include a camera height $h_c$ relative to the ground plane 404, a camera focal distance $f_p$, and a camera tilt β relative to the ground plane 404. The remote computing node 145 is further programmed to determine the 6DoF pose 1308 for the object 1102 based on the object parameters 1302, the distance D, and the angle θ.

Turning now to FIG. 1, the vehicle 105 includes the vehicle computer 110, sensors 115, actuators 120 to actuate various vehicle components 125, and a vehicle communications module 130. The communications module 130 allows the vehicle computer 110 to communicate with a remote server computer 140, a remote computing node 145, and/or other vehicles, e.g., via a messaging or broadcast protocol such as Dedicated Short Range Communications (DSRC), cellular, and/or other protocol that can support vehicle-to-vehicle, vehicle-to infrastructure, vehicle-to-cloud communications, or the like, and/or via a packet network 135.

The vehicle computer 110 includes a processor and a memory such as are known. The memory includes one or more forms of computer-readable media, and stores instructions executable by the vehicle computer 110 for performing various operations, including as disclosed herein. The vehicle computer 110 can further include two or more computing devices operating in concert to carry out vehicle operations including as described herein. Further, the vehicle computer 110 can be a generic computer with a processor and memory as described above, and/or may include an electronic control unit (ECU) or electronic controller or the like for a specific function or set of functions, and/or may include a dedicated electronic circuit including an ASIC that is manufactured for a particular operation, e.g., an ASIC for processing sensor data and/or communicating the sensor 115 data. In another example, the vehicle computer 110 may include an FPGA (Field-Programmable Gate Array) which is an integrated circuit manufactured to be configurable by a user. Typically, a hardware description language such as VHDL (Very High Speed Integrated Circuit Hardware Description Language) is used in electronic design automation to describe digital and mixed-signal systems such as FPGA and ASIC. For example, an ASIC is manufactured based on VHDL programming provided pre-manufacturing, whereas logical components inside an FPGA may be configured based on VHDL programming, e.g., stored in a memory electrically connected to the FPGA circuit. In some examples, a combination of processor(s), ASIC(s), and/or FPGA circuits may be included in the vehicle computer 110.

The vehicle computer 110 may operate and/or monitor the vehicle 105 in an autonomous mode, a semi-autonomous mode, or a non-autonomous (or manual) mode, i.e., can control and/or monitor operation of the vehicle 105, including controlling and/or monitoring components 125. For purposes of this disclosure, an autonomous mode is defined as one in which each of vehicle 105 propulsion, braking, and steering are controlled by the vehicle computer 110; in a semi-autonomous mode the vehicle computer 110 controls one or two of vehicle 105 propulsion, braking, and steering; in a non-autonomous mode a human operator controls each of vehicle 105 propulsion, braking, and steering.

The vehicle computer 110 may include programming to operate one or more of vehicle 105 brakes, propulsion (e.g., control of acceleration in the vehicle 105 by controlling one or more of an internal combustion engine, electric motor, hybrid engine, etc.), steering, transmission, climate control, interior and/or exterior lights, horn, doors, etc., as well as to determine whether and when the vehicle computer 110, as opposed to a human operator, is to control such operations.

The vehicle computer 110 may include or be communicatively coupled to, e.g., via a vehicle communications network such as a communications bus as described further below, more than one processor, e.g., included in electronic controller units (ECUs) or the like included in the vehicle 105 for monitoring and/or controlling various vehicle components 125, e.g., a transmission controller, a brake controller, a steering controller, etc. The vehicle computer 110 is generally arranged for communications on a vehicle communication network that can include a bus in the vehicle 105 such as a controller area network (CAN) or the like, and/or other wired and/or wireless mechanisms.

Via the vehicle 105 network, the vehicle computer 110 may transmit messages to various devices in the vehicle 105 and/or receive messages (e.g., CAN messages) from the various devices, e.g., sensors 115, actuators 120, ECUs, etc. Alternatively, or additionally, in cases where the vehicle computer 110 actually comprises a plurality of devices, the vehicle communication network may be used for communications between devices represented as the vehicle computer 110 in this disclosure. Further, as mentioned below, various controllers and/or sensors 115 may provide data to the vehicle computer 110 via the vehicle communication network.

The vehicle computer 110 is programmed to receive data from one or more sensors 115 substantially continuously, periodically, and/or when instructed by a remote server computer 140, etc. The sensors 115 may include a variety of devices such as are known, e.g., Light Detection And Ranging (LIDAR) sensor (s), radar sensors, camera sensors, etc., to provide data, e.g., about an environment around the vehicle 105 including one or more objects 215, e.g., a vehicle, a sign, a tree, etc., to the vehicle computer 110. In the context of this disclosure, an object is a physical, i.e., material, item that has mass and that can be represented by physical phenomena (e.g., light or other electromagnetic waves, or sound, etc.) detectable by sensors. Thus, the vehicle 105, as well as other items including as discussed below, fall within the definition of "object" herein.

The vehicle 105 actuators 120 are implemented via circuits, chips, or other electronic and or mechanical components that can actuate various vehicle 105 subsystems in accordance with appropriate control signals as is known. The actuators 120 may be used to control components 125, including braking, acceleration, and steering of a vehicle 105.

In the context of the present disclosure, a vehicle component 125 is one or more hardware components adapted to perform a mechanical or electro-mechanical function or operation-such as moving the vehicle 105, slowing or stopping the vehicle 105, steering the vehicle 105, etc. Non-limiting examples of components 125 include a propulsion component (that includes, e.g., an internal combustion engine and/or an electric motor, etc.), a transmission component, a steering component (e.g., that may include one or more of a steering wheel, a steering rack, etc.), a suspension component (e.g., that may include one or more of a damper, e.g., a shock or a strut, a bushing, a spring, a control arm, a ball joint, a linkage, etc.), a brake component, a park assist component, an adaptive cruise control component, an adaptive steering component, one or more passive restraint systems (e.g., airbags), a movable seat, etc.

In addition, the vehicle computer 110 may be configured for communicating via a vehicle-to-vehicle communications module 130 or interface with devices outside of the vehicle, e.g., through a vehicle-to-vehicle (V2V) or vehicle-to-infrastructure (V2X) wireless communications (cellular and/or short-range radio communications, etc.) to another vehicle, and/or to a remote server computer 140 (typically via direct radio frequency communications). The communications module 130 could include one or more mechanisms, such as a transceiver, by which the computers of vehicles may communicate, including any desired combination of wireless (e.g., cellular, wireless, satellite, microwave and radio frequency) communication mechanisms and any desired network topology (or topologies when a plurality of communication mechanisms are utilized). Exemplary communications provided via the communications module include cellular, Bluetooth, IEEE 802.11, dedicated short range communications (DSRC), cellular V2X (CV2X), and/or wide area networks (WAN), including the Internet, providing data communication services. For convenience, the label "V2X" is used herein for communications that may be vehicle-to-vehicle (V2V) and/or vehicle-to-infrastructure (V2I), and that may be provided by the communications module 130 according to any suitable short-range communications mechanism, e.g., DSRC, cellular, or the like.

The network 135 represents one or more mechanisms by which a vehicle computer 110 may communicate with remote computing devices, e.g., the remote server computer 140, the remote computing node 145, another vehicle computer, etc. Accordingly, the network 135 can be one or more of various wired or wireless communication mechanisms, including any desired combination of wired (e.g., cable and fiber) and/or wireless (e.g., cellular, wireless, satellite, microwave, and radio frequency) communication mechanisms and any desired network topology (or topologies when multiple communication mechanisms are utilized). Exemplary communication networks 135 include wireless communication networks (e.g., using Bluetooth®, Bluetooth® Low Energy (BLE), IEEE 802.11, vehicle-to-vehicle (V2V) such as Dedicated Short Range Communications (DSRC), etc.), local area networks (LAN) and/or wide area networks (WAN), including the Internet, providing data communication services.

The remote server computer 140 can be a conventional computing device, i.e., including one or more processors and one or more memories, programmed to provide operations such as disclosed herein. Further, the remote server computer 140 can be accessed via the network 135, e.g., the Internet, a cellular network, and/or or some other wide area network.

Object detection system 100 can include one or more remote computing nodes 145, where a remote computing node 145 is one or more computing devices that acquires sensor data, for example from a camera 150, and communicates with objects, including vehicles 105, e.g., via a V-to-I interface or the like in a local portion of one or more of a roadway, parking lot or parking structure, etc., and/or with the remote server computer 140, e.g., via the network 135. It is advantageous for a remote computing node 145 to be geographically close (e.g., less than one kilometer) to the objects, e.g., vehicles, and cameras 150 it communicates with to prevent communication lag. Communication lag is a time delay in messages sent between a remote computing node 145 and an object or a camera 150. A time delay of greater than a few (1-10) hundred milliseconds per message can result in unacceptable performance of a remote computing node 145 and can be prevented by placing the remote computing node 145 in geographic proximity to cameras 150 and objects. A remote computing node 145 can also be connected with cameras 150 and objects via a dedicated wireless network that guarantees acceptable communication lag regardless of where the remote computing node 145 is physically located. A dedicated wireless network is a wireless network in which access is limited to preserve network bandwidth for permitted users.

For example, camera 150 can be a stationary video camera attached to a pole 155, building, or other structure to give the camera 150 a view of a ground surface. Mobile sensors such as a camera 150 can alternatively or additionally be mounted on aerial drones or other mobile platforms to provide views of a ground surface from positions not available to stationary sensors. Remote computing nodes 145 further can be in communication with computers included in the respective objects, e.g., the vehicle computer 110, and the remote server computer 140. The remote server computer 140 can be called upon by remote computing nodes 145 to provide additional computing resources when needed.

Figure 2:
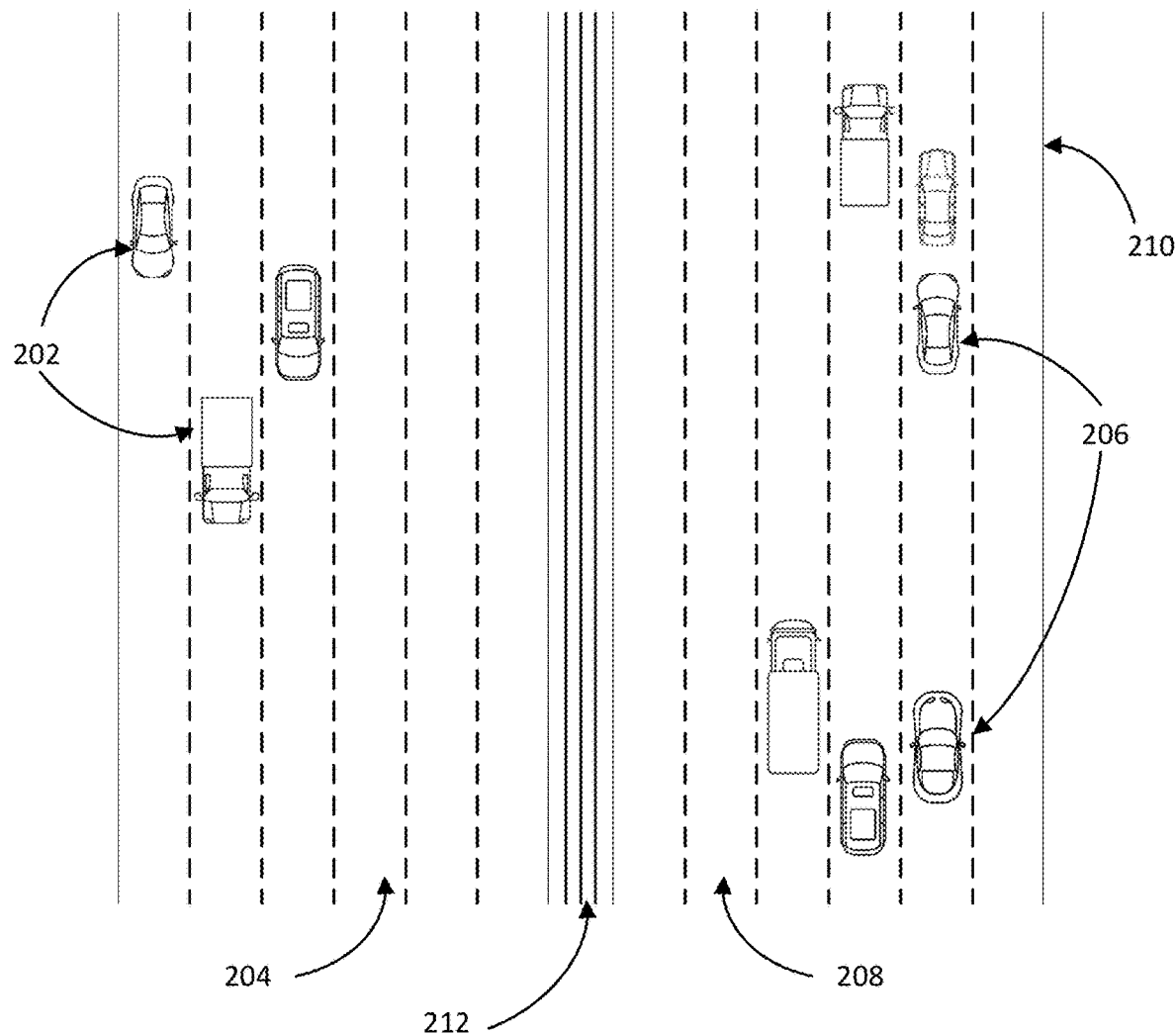
FIG. 2 is a diagram of a top-down view of a real-world traffic scene.

FIG. 2 is a diagram of a traffic scene 200. Traffic scene 200 is viewed from above and includes first vehicles 202 traveling in traffic lanes 204 in a first direction and second vehicles 206 traveling in traffic lanes 208 in a second direction on a roadway 210. Traffic lanes 204 and 206 are separated by a median 212.

Figure 3:
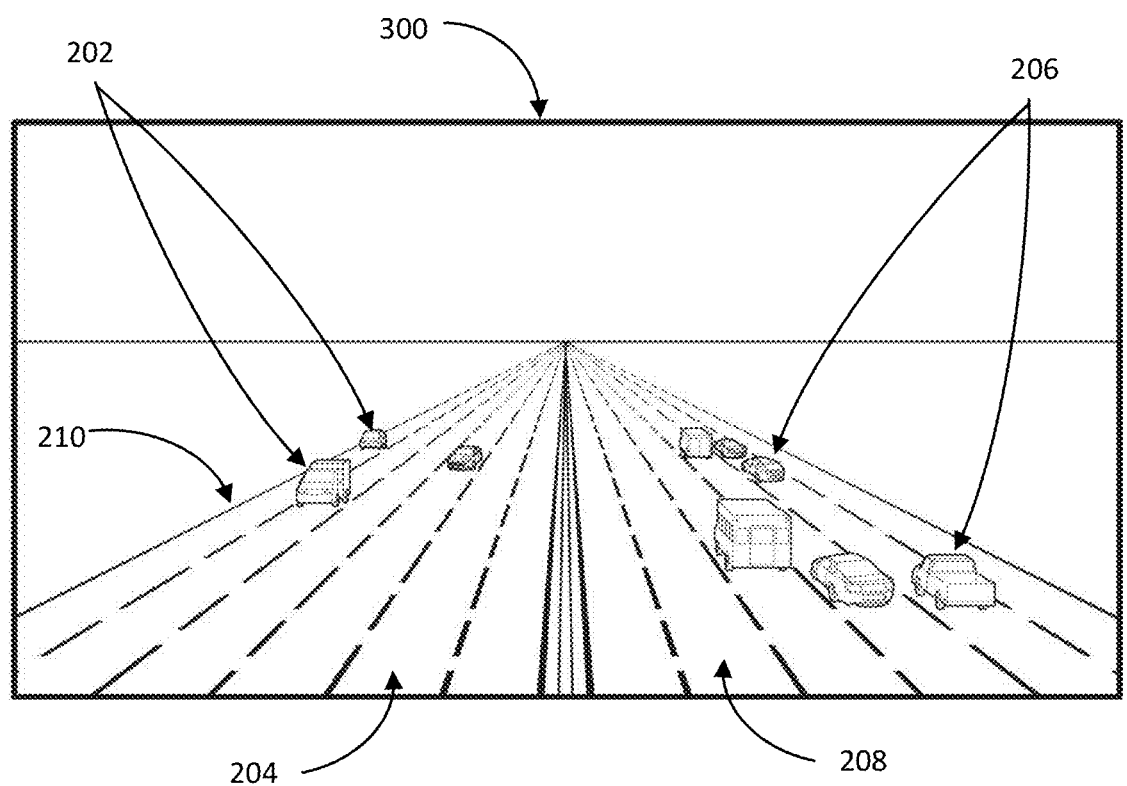
FIG. 3 is a diagram of an image of a traffic scene viewed by a camera.

FIG. 3 is a diagram of an image 300 of the traffic scene 200 from FIG. 2. An image 300 of a real-world traffic scene 200 can be captured by the camera 150. That is, the camera 150 may be positioned to have a field of view including the roadway 210. The image 300 includes the first vehicles 202 in the traffic lanes 204 and the second vehicles 206 in the traffic lanes 208. The video camera can acquire color image data, where each frame of image data is encoded as three frames of red, blue and green (RGB) data that can be combined to generate a color image.

Figure 4:
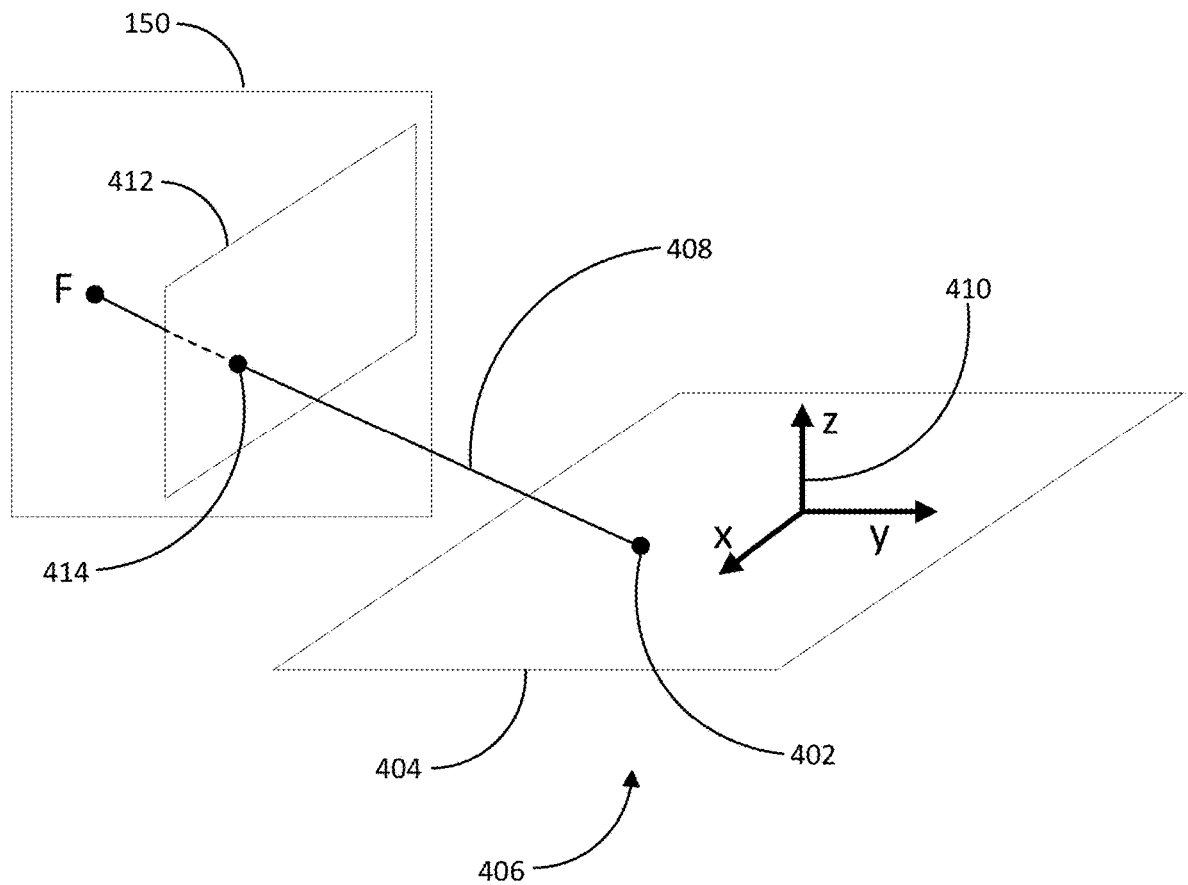
FIG. 4 is a diagram of a camera.

FIG. 4 is a diagram of the camera 150. In FIG. 4, a point 402 on or near a ground plane 404 in a real-world scene 406 can reflect or emit a ray of light 408 that is acquired by camera 150. The ground plane 404 can correspond to the roadway 210 in a real-world scene 406, for example, and can be described by real-world coordinates 410. The ground plane 404 can be determined by measuring the three-dimensional locations of points on the roadway 210 and fitting a plane to the points. The ground plane 404 can be fit to the points using a least-squares algorithm, for example. A least-squares algorithm minimizes the differences between the real-world locations of points and the location of the ground plane 404. The real-world coordinates 410 can describe the location and orientation of a ground plane 404 and a point 402 in six axes, namely three x, y, and z location axes and three roll, pitch, and yaw rotations about the three location axes, respectively. The camera 150 images one or more rays of light 408 from one or more points 402 onto an image sensor 412 to create pixel data at a pixel location 414 on the image sensor 412. The image sensor 412 converts rays of light 408 to electrical signals and then digital values at pixel locations to create the image 300.

A camera 150 typically images rays of light 408 onto the image sensor 412 via a lens. The process by which a lens images a ray of light 408 onto an image sensor 412 can be simplified by assuming that all of the rays of light 408 pass through a pinhole which replaces the lens, i.e., by using what is known as "pinhole geometry." Such pinhole geometry can be further simplified by assuming that the rays of light 408 all pass through the image sensor 412 to meet at an optical center of the lens F behind the image sensor 412. In this fashion, a camera 150 generates an image 300 of a real-world scene 406 by creating pixel data at pixel locations 414 based on the real-world coordinates 410 of points 402 and the optical center F of camera 150.

Figure 5:
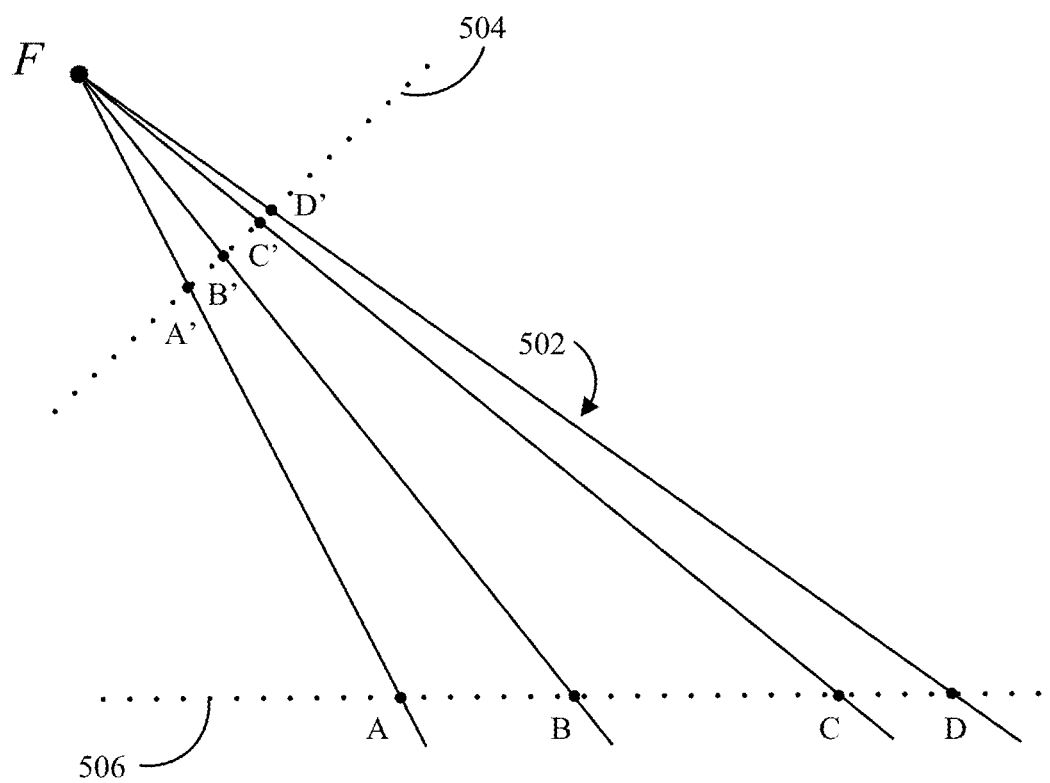
FIG. 5 is a diagram of cross-ratio invariance.

FIG. 5 is a diagram of cross-ratio invariance. Cross-ratio invariance is a property of an optical system such as a camera 150 that can be modeled using pinhole optics as demonstrated in FIG. 4. Bisecting any four straight lines 502 that meet at an optical center F with two straight lines 504, 506 forms two sets of colinear points (A, B, C, D) and (A', B', C', D'). Cross-ratio invariance means that a ratio of distances between the points, denoted as (AC), (BC), (AD)

and (A'C'), (B'C'), (A'D') are invariant regardless of the locations of lines 504, 506 with respect to the optical center F. Cross-ratio invariance is expressed by the equation:

$$\frac{(AC)(BC)}{(BC)(AD)} = \frac{(A'C')(B'C')}{(B'C')(A'D')} \quad (1)$$

In this example, line 506 can be a ground plane 404 corresponding to a roadway 210 and line 504 can be an image sensor 412 and F is the optical center of a camera 150.

Cross-ratio invariance can be used to determine distances to objects in image data. For example, assume that (A, B, C, D) are pixel locations in an image. Distances (AC), (BC), (AD) can be determined by measuring Euclidian distances between pixels in the image. Assume also that distances (A'B') and (C'D') are determined by physically measuring distances on a roadway corresponding to a ground plane in real-world coordinates. These distances can correspond to any features of the roadway that will occur in an image. Assume that a distance (B'C')=W is the unknown quantity to be determined. This unknown quantity can be the location of an object on the roadway to be determined. Substituting for the unknown quantity in equation (1) yields an algebraic equation:

$$\frac{(AC)(BC)}{(BC)(AD)} = \frac{(A'B' + W)(W + C'D')}{W((A'B') + W + (C'D'))} \quad (2)$$

This equation can be solved for W in terms of measured quantities (AC), (BC), (AD) and (A'B'), (C'D') thereby determining the distance W in real-world coordinates.

Figure 6:
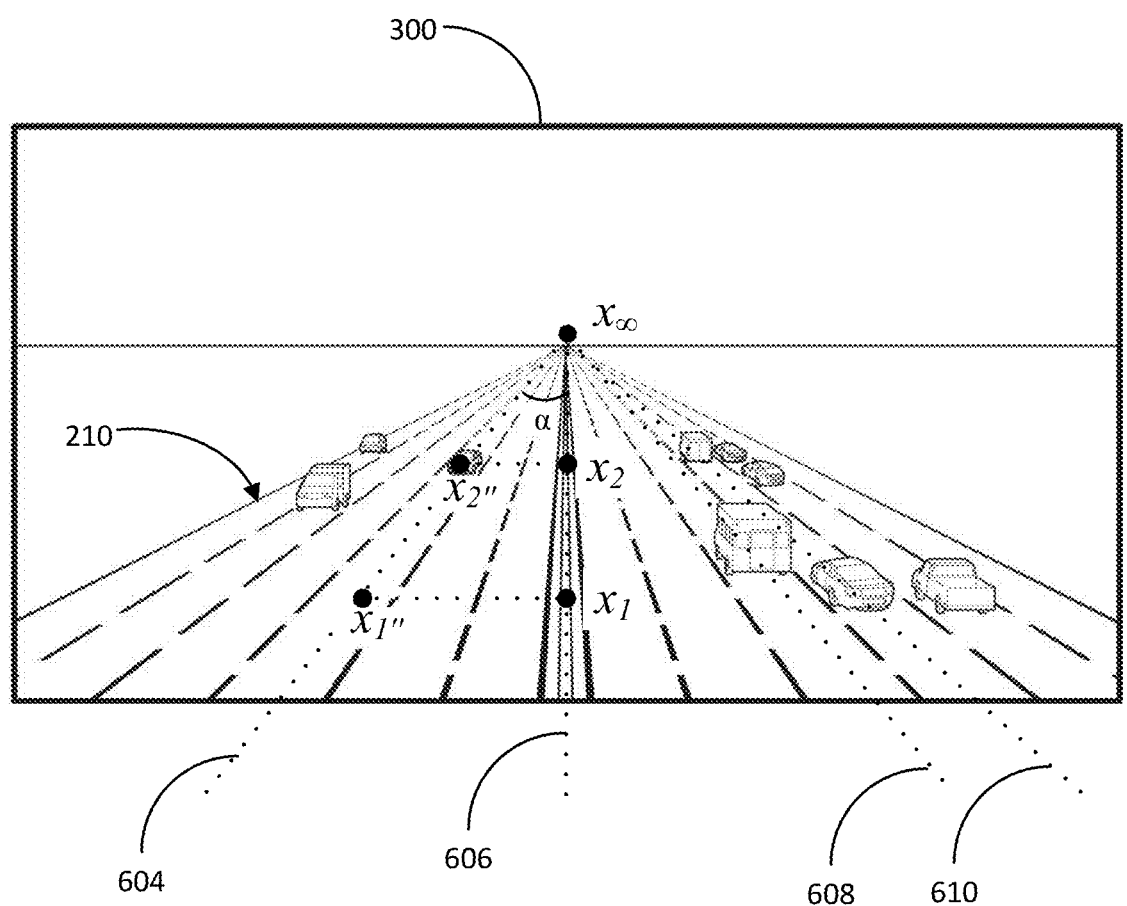
FIG. 6 is a diagram of cross-ratio invariance applied to traffic data.

FIG. 6 is a diagram of traffic data analysis using cross-ratio invariance on the image 300 of the traffic scene 200 including the roadway 210. Traffic flow analysis begins by determining a vanishing point $x_\infty$ in the image 300. Vanishing point $x_\infty$ can be determined by constructing a series of lines 604, 606, 608, 610 (dotted lines) along features known to be parallel in the real-world, i.e., traffic lanes on the roadway 210. The vanishing point $x_\infty$ is the point where the lines 604, 606, 608, 610 meet due to perspective distortion in the image 300. Assume the problem is to determine a distance $d_{x_1,x_2}$ between points $x_1$ and $x_2$ in image 300 in real-world coordinates. Then the problem can be solved by expressing the distance $d_{x_1,x_2}$ as a cross-ratio invariance equation as will be shown in relation to FIG. 7, below.

Figure 7:
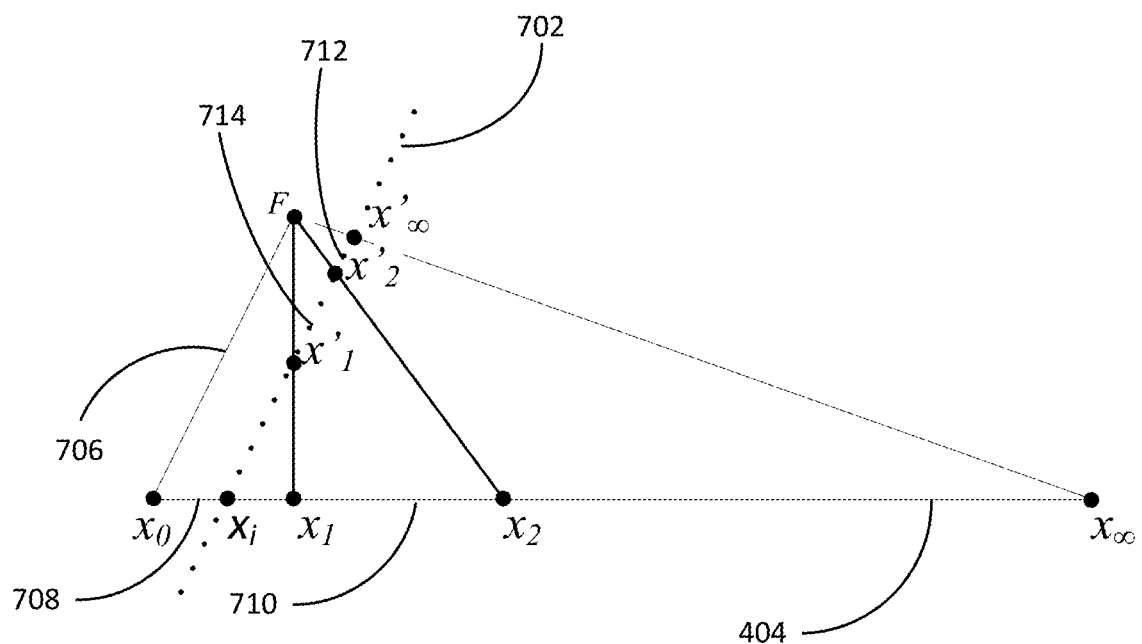
FIG. 7 is another diagram of cross-ratio invariance applied to traffic data.

FIG. 7 is a diagram of traffic data analysis using cross-ratio invariance 700 that illustrates the process by looking at a plane through line 606 of FIG. 6 perpendicular to the roadway 210. The diagram of traffic data analysis using cross-ratio invariance 700 includes an image sensor plane 702 and the ground plane 404 corresponding to roadway 210. Image sensor plane 702 is a plane corresponding to the location of the image sensor 412 from FIG. 4. Points $x_1$, $x_2$, and $x_\infty$ from image 300 from FIG. 6 are included on ground plane 404. Also include on ground plane 404 are point $x_0$, which is the projection of the optical center F onto the ground plane 404 parallel to the image sensor plane 702 and point $x_i$, which is the projection of the image sensor plane 702 onto the ground plane 404.

Intersections of the image sensor plane 702 with the lines connecting the optical center F with points $x_1$, $x_2$, and $x_\infty$ form points $x_1'$, $x_2'$, and $x_\infty'$, respectively. $d_{F,x_0}$ is the length of line segment 706 from the optical center F to the point $x_0$, measured in real-world coordinates, for example, meters. $d_{x_0,x_i}$ is the length of the line segment 708 from point $x_0$ to the point $x_i$, real-world coordinates, for example, meters. $d_{x_1,x_2}$ is the length of the line segment 710 from point $x_1$ to point $x_2$, measured in real-world coordinates, for example, meters. $d_{x_\infty',x_2'}$ is the length of the line segment 712 from point $x_\infty'$ to point $x_2'$ in the image sensor plane 702, measured in pixels. $d_{x_\infty',x_1'}$ is the length of the line segment 714 from point $x_\infty'$ to point $x_1'$ in the image sensor plane 702, measured in pixels. Applying cross-ratio invariance to these variables to determine the distance $d_{x_1,x_2}$ yields the equation:

$$d_{x_1,x_2} = \frac{md_{F,x_0}d_{x_0,x_i}}{d_{x_\infty',x_2'}} - \frac{md_{F,x_0}d_{x_0,x_i}}{d_{x_\infty',x_1'}} \quad (3)$$

Where m is the number of pixels per unit distance, in this example pixels/meter. The value m is camera dependent and is based on the magnification of the lens. Equation (3) can be re-written by recognizing that the value $md_{F,x_0}d_{x_0,x_i}=\tau$ is constant for a given camera at a fixed height and orientation to a ground plane 404:

$$d_{x_1,x_2} = \frac{\tau}{d_{x_\infty',x_2'}} - \frac{\tau}{d_{x_\infty',x_1'}} \quad (4)$$

In examples where a line segment in ground plane 404 is not perpendicular to the image sensor plane 702, for example line 604 in FIG. 6, equation (4) is modified to be:

$$d_{x_1,x_2} = \frac{\tau}{d_{x_\infty',x_2''}\cos(\alpha_{x_\infty',x_2''})} - \frac{\tau}{d_{x_\infty',x_1''}\cos(\alpha_{x_\infty',x_1''})} \quad (5)$$

where $x''_1$ and $x_2''$ are points on line 604 from FIG. 6, and a is a projection angle between lines 604 and 606 in FIG. 6. The constant t can be determined according to techniques discussed in relation to FIGS. 8-10.

Figure 8:
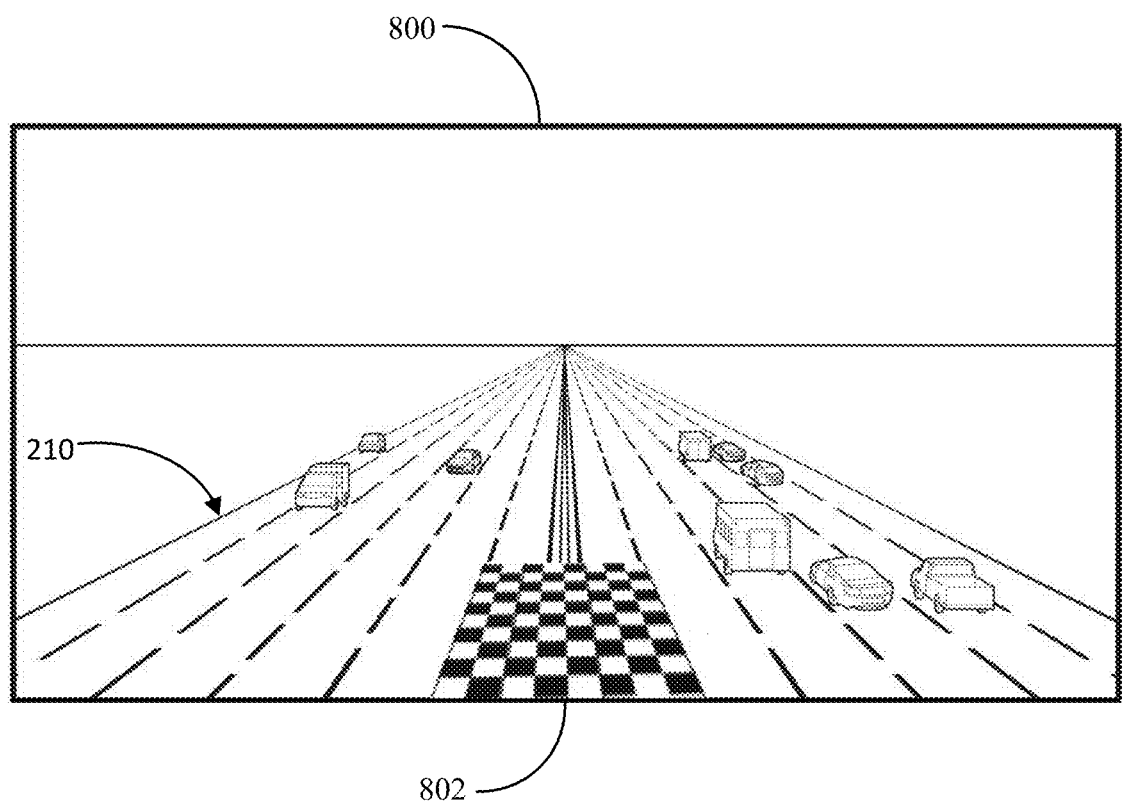
FIG. 8 is a diagram of a calibration pattern.

FIG. 8 is a diagram of a calibration image 800 that includes a calibration pattern 802. A calibration pattern is a visual pattern such as a two-dimensional checkerboard pattern of alternating black and white squares, typically applied to a thin, flat, typically square substrate made of wood, plastic, metal or thick cardboard. The high-contrast pattern can be printed or painted on the substrate. The calibration image 800 can be used to determine camera 150 intrinsic parameters, such as focal distance $f_p$, and camera 150 extrinsic parameters, such as camera height $h_c$ (as described below, see FIG. 9) and camera tilt β (as described below, see FIG. 10). Camera 150 intrinsic and camera 150 extrinsic parameters can be determined by inputting the calibration image 800 into a camera calibration application, an application in MatLab®, in one example. MatLab is a collection of software programs that calculate mathematical and machine vision tasks produced by MathWorks, Natick, MA 01760.

The MatLab camera calibration application that calculates camera 150 intrinsic and extrinsic parameters based on an input image of a checkerboard calibration pattern 802. The MatLab camera calibration application can assume a pinhole model for the camera 150 to be calibrated. The camera 150 intrinsic parameters include focal distances in the x and y directions and a location of an optical center F, both calculated with respect to an image sensor 412. The camera 150 extrinsic parameters include rotation and translation matrices that transform points on the calibration pattern 802 measured in real-world coordinates into camera coordinates. The camera 150 intrinsic parameters are then used to transform the points in camera coordinates onto the image sensor 412 to form an image.

Calibration pattern 802 is a checkerboard pattern of equally-sized alternating black and white squares. The size of the squares in the calibration pattern 802 are measured to permit the real-world size of the squares to be input to the MatLab camera calibration application. The real-world size of a pixel in both the x and y directions are input to the MatLab camera calibration program to permit translations between real-world measurements and pixel measurements. The real-world size of a pixel can be determined by dividing the real-world size of the image sensor 412 in the x and y directions by the number of pixels in each direction. These values are typically available from the manufacturer of the image sensor 412. The calibration pattern 802 is arranged to be parallel to the ground plane 404 corresponding to the roadway 210. If the calibration pattern 802 is not located on the roadway 210, the distance from the calibration pattern 802 to the roadway 210 can be measured to determine the location of the ground plane 404 corresponding to the roadway 210 in image 800.

The camera 150 focal distance $f_p$ can be determined directly from the camera 150 intrinsic parameters output from the MatLab camera calibration application. In response to inputting an image 800 that includes a calibration pattern 802 along with parameters that specify the size of the calibration pattern 802, the MatLab camera calibration application outputs a transposed 3×3 (three-by-three) intrinsic camera calibration parameter matrix, $K^T$:

$$K^T = \begin{bmatrix} f_x & 0 & 0 \\ s & f_y & 0 \\ c_x & c_y & 1 \end{bmatrix} \quad (6)$$

where $f_x$ is the focal distance in pixels in the x direction with respect to the image sensor 412, $f_y$ is the focal distance in pixels in the y direction with respect to the image sensor 412, $c_x$ and $c_y$ are the location of the optical center F in the x and y directions, respectively, measured in pixels and s is the skew coefficient which measures any deviation from a rectangle by the image sensor 412, i.e., a deviation exists if the image sensor 412 x and y axes are not perpendicular. The focal distance $f_p$ can be determined from the intrinsic camera calibration parameters (5) output from the MatLab camera calibration application by averaging the $f_x$ and $f_y$ focal distance parameters:

$$f_p = \frac{f_x + f_y}{2} \quad (7)$$

Figure 9:
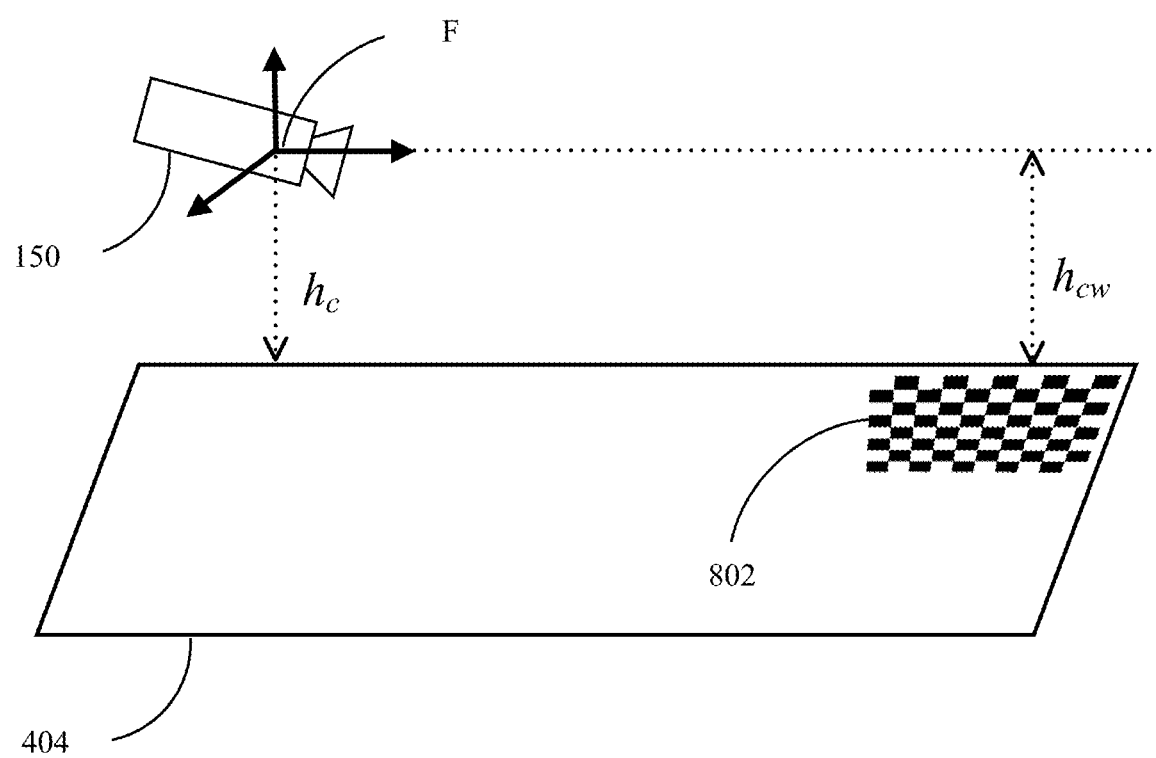
FIG. 9 is a diagram of camera height calibration.

FIG. 9 is a diagram of camera height calibration. Camera height $h_c$ can be determined from the camera 150 extrinsic parameters output by the MatLab camera calibration application. The camera 150 extrinsic parameters include two matrices $cam_{t_{wrld}}$ and $cam_{R_{wrld}}$. The 1×3 matrix $cam_{t_{wrld}}$ includes parameters that translate the x, y, and z real-world coordinates of the calibration pattern 802 to the optical center F of the camera 150. The 3×3 matrix $cam_{R_{wrld}}$ rotates the calibration pattern 802 to make it parallel to the image sensor 412. In general, the second term of the translation matrix $cam_{t_{wrld}}$ is the distance $h_c$ between the x-axis of the real-world coordinate system passing through the optical center F of camera 150 and the ground plane 404 upon which the calibration pattern 802 rests.

Determination of the camera height $h_c$ can be complicated by the ground plane 404 not being parallel to the x-axis of the real-world coordinate system passing through the optical center F of camera 150. The 3×3 matrix $cam_{R_{wrld}}$ can be used to compensate for tilt in the ground plane by calculating the x-axis tilt $\Psi_x$ based on parameters $r_{32}$ and $r_{33}$ of the $cam_{R_{wrld}}$ using the equation:

$$\Psi_x = \mathrm{atan}\,2(r_{32}, r_{33}) \quad (8)$$

where the atan 2 is a function that calculates the arc tangent of $r_{32}$, $r_{33}$, while determining the correct quadrant and thereby the correct sign with which to calculate the arc tangent. The x-axis tilt $\Psi_x$ can be then used to compensate for the tilt by adding a value determined by multiplying the tangent of the x-axis tilt $\Psi_x$ with the x-axis distance from the third parameter from the $cam_{t_{wrld}}$ matrix, which is the distance of the camera 150 from the calibration pattern 802 in the x direction, to the y-axis or second term from the $cam_{t_{wrld}}$ matrix to form a corrected $h_c$.

Figure 10:
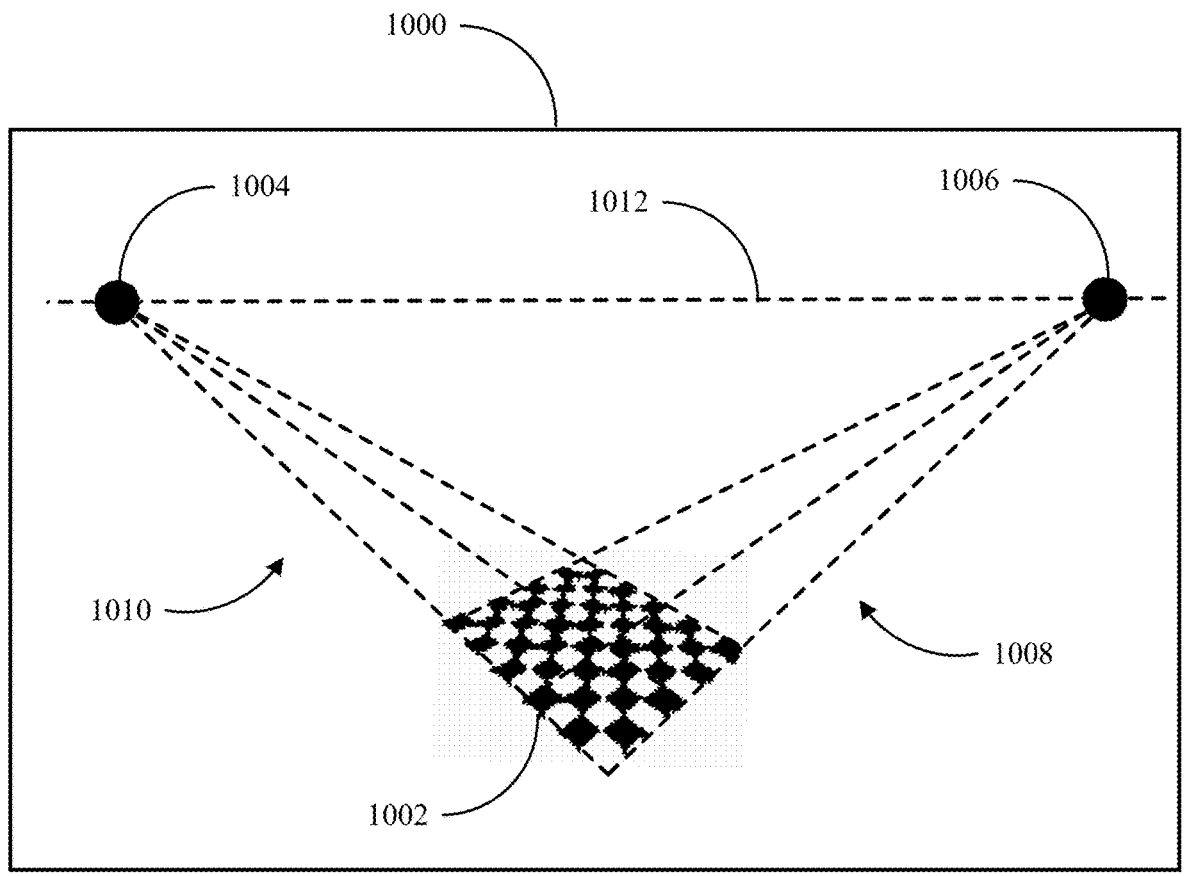
FIG. 10 is a diagram of camera tilt calibration.

FIG. 10 is a diagram of camera tilt calibration. Camera tilt β is the angle, measured in degrees, below horizontal, at which a camera 150 is set or arranged in order to view a scene from above. Camera tilt calibration is performed by determining two or more vanishing points 1004, 1006 in an image 1000 of a calibration pattern 802 by extending sets of parallel lines 1008, 1010 until they meet at vanishing points 1004, 1006. Connecting the vanishing points 1004, 1006 generates a vanishing line 1012 or $V_{line}$ in image 1000. Camera tilt β can be determined by estimating a distance $d_{pp,V_{line}}$ in pixels between the optical center F of the camera, also referred to as the principle point $P_p$, and the vanishing line 1012. The focal distance $f_p$ and the distance between the principle point $P_p$ and a line perpendicular to the vanishing line $V_{line}$ can be used to determine camera tilt β according to the equation:

$$\beta = \tan^{-1}\left(\frac{f_p}{d_{pp,V_{line}}}\right) \quad (9)$$

Camera tilt β can also be determined directly from the camera 150 intrinsic and extrinsic parameters output from the MatLab camera calibration application. The MatLab camera calibration application outputs a 3×3 matrix of camera 150 intrinsic parameters K, a 3×3 matrix of rotational camera 150 extrinsic parameters R and a 1×3 vector of translation parameters T. A 1×4 vector of dimensionless parameters $P = [p_1\ p_2\ p_3\ p_4]$ can be formed by the equation:

$$P = K[R|T] = [p_1 p_2 p_3 p_4] \quad (10)$$

Which can be used to estimate the distance $d_{pp,V_{line}}$ between the principal point $P_p$ and the vanishing line $V_{line}$ according to the equation:

$$d_{pp,V_{line}} = \frac{(p_1 \times p_2)^T \cdot [P_p 1]}{\|P_p\|} \quad (11)$$

Once $d_{pp,V_{line}}$ is determined, equation (9) can be used to determine camera tilt β.

The camera calibration constant τ can be determined directly based on camera focal distance $f_p$, camera height $h_c$, and camera tilt β all of which are output by the MatLab camera calibration application in response to inputting a calibration image 800 as described above in relation to FIGS. 8-10 according to the following equation:

$$\tau = \frac{h_c f_p}{(\sin\beta)^2} \tag{12}$$

Determining the camera calibration constant τ directly from camera 150 intrinsic and extrinsic parameters in this fashion improves determination of distances in image data by eliminating the need to perform multiple measurements of ground truth point locations in a traffic scene, determining and measuring the locations of the measured points in an image, measuring the locations of the ground truth points in an image and calculating equation (4). Techniques described herein can be performed more quickly and less expensively than previous techniques for determining the camera calibration constant τ. Determining the camera calibration constant τ in this fashion also requires fewer computing resources to obtain a value for τ than acquiring and processing multiple images to find a minimum value for τ.

Figure 11:
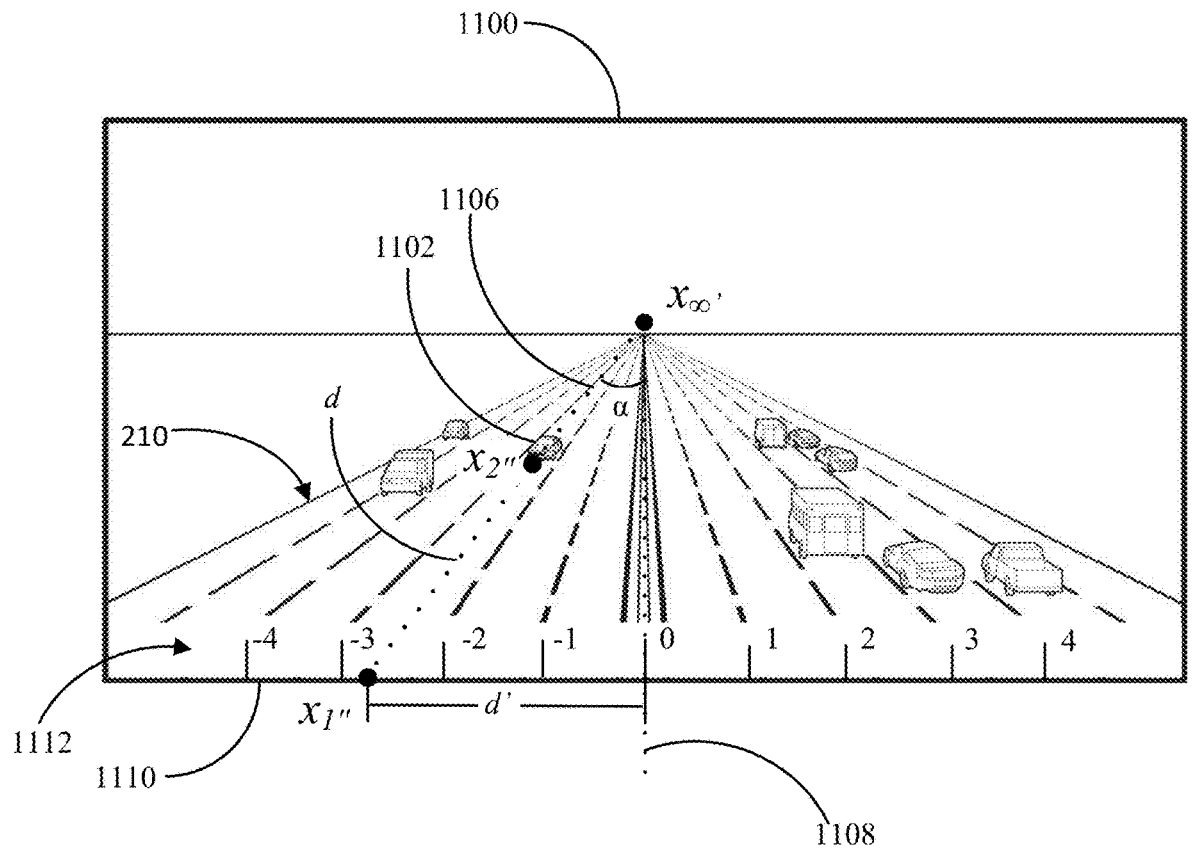
FIG. 11 is a diagram of cross-ratio invariance and camera calibration applied to traffic data.

FIG. 11 is a diagram of cross-ratio invariance and camera calibration processing applied to traffic data. The remote computing node 145 calibrates the camera 150 according to the techniques discussed in relation to FIGS. 8-10 to determine the camera calibration constant τ. An image 1100 is acquired by the camera 150 and communicated to the remote computing node 145. Using techniques discussed herein, the remote computing node 145 can determine a first distance d to an object 1102, for example a vehicle, on a roadway 210 in a field of view of camera 150.

The first distance d to the object 1102 can be determined using a version of equation (4), discussed above in relation to FIG. 7:

$$d = \frac{\tau}{d_{x'_\infty,x''_2}\cos(\alpha)} - \frac{\tau}{d_{x'_\infty,x''_1}\cos(\alpha)} \tag{13}$$

where $d_{x'_\infty,x''_2}$ is a distance in pixels between the point $x_2''$ and the vanishing point $x_\infty'$ in image 1100, $d_{x'_\infty,x''_1}$ is a distance in pixels between the point $x_1''$ and the vanishing point $x_\infty'$ in image 1100, α is the projection angle between lines 1106 and 1108 in image 1100, and τ is the camera calibration constant determined, as discussed above in relation to FIGS. 8-10. The remote computing node 145 determines the calibrates vanishing point $x_\infty'$ according to the techniques discussed in relation to FIG. 6 above. The remote computing node 145 determines the point $x_2''$ based on a three-dimensional (3D) bounding box for the object 1102 (as discussed below; see FIG. 13). The line 1106 extends through the point $x_2''$ and the vanishing point $x_\infty'$. The remote computing node 145 determines the point $x_1''$ based on an intersection of the line 1106 and a line 1110 corresponding to a bottom boundary of the image 1100. The line 1108 corresponds to the optical axis of camera 150. The optical axis of camera 150 is a line passing through both the center of the image sensor 412 and the optical center F.

Upon determining the point $x_1''$, the remote computing node 145 can determine a second distance d'. The second distance d' is the distance between the line 1108 and the point $x_1''$ on line 1110. The second distance d' can be determined by interpolating between measuring fiducials 1112. Measuring fiducials 1112 are marks, i.e., fiducial marks, labeled with distances in real-world coordinates, for example meters. Measuring fiducials 1112 can be placed in the traffic scene 200 in the field of view of camera 150 by painting the marks and labels on the roadway 1104, for example. Measuring fiducials can also be virtual, where the measuring fiducials 1112 are inserted into the image 1100 by the remote computing node 145. The measuring fiducials 1112 shown in FIG. 11 are merely illustrative of exemplary marks corresponding to a lane width; it will be understood that more or fewer marks corresponding to various distances may be placed in the traffic scene 200. The conversion between measured pixels and real-world coordinates for the second distance d' can be determined by linear interpolation, e.g., based on the measuring fiducials 1112 and the number of pixels per unit distance m for the camera 150. Once the second distance d' is determined in real-world coordinates, the distance D can be determined directly from equation (14) below.

Figure 12:
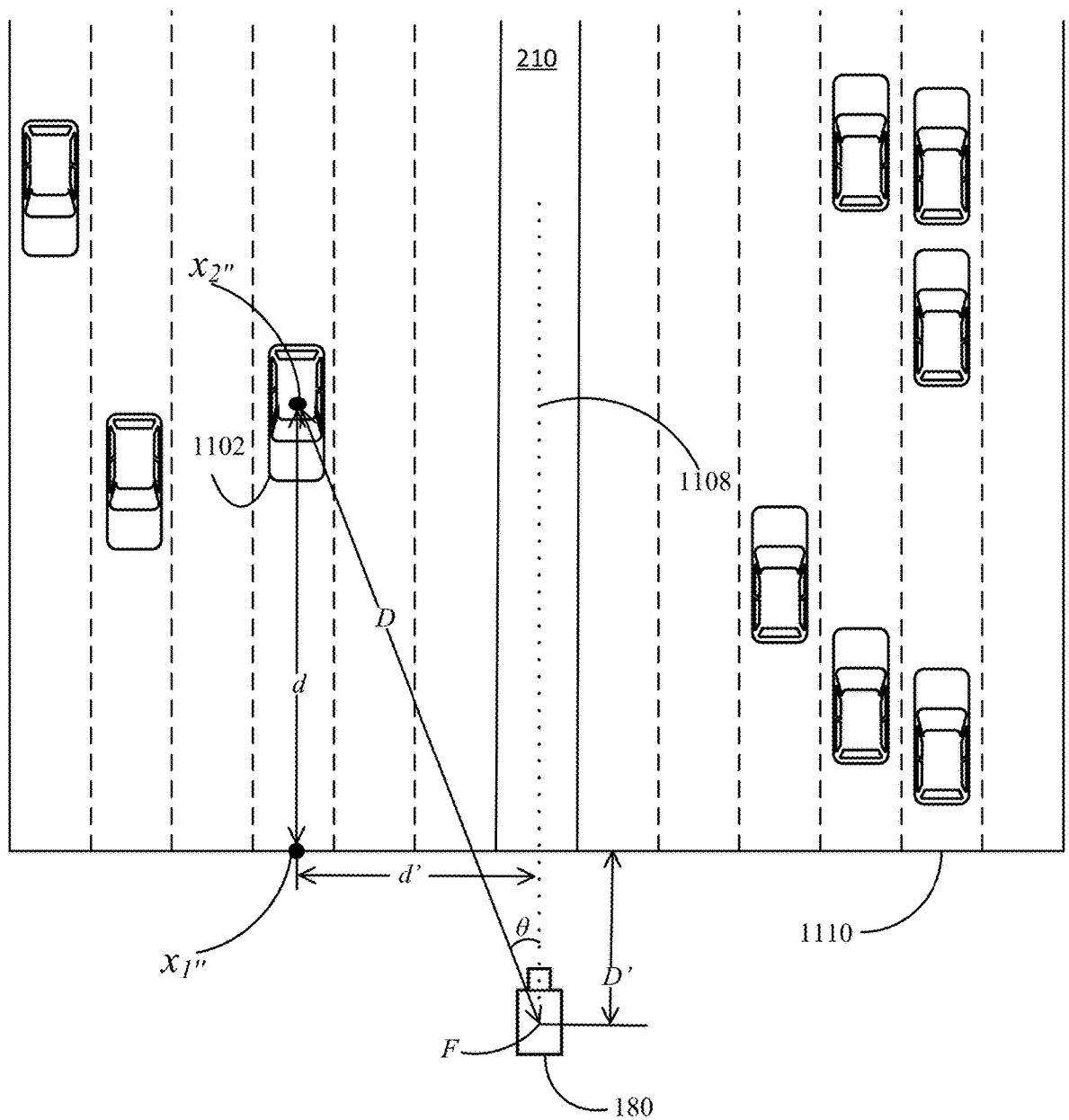
FIG. 12 is a top view of FIG. 11.

FIG. 12 is a top view of the traffic scene 200 in image 1100. The remote computing node 145 can determine the distance D, in real coordinates, between the optical center F of the camera 150 and the object 1102 based on the first distance d and the second distance d'. For example, the remote computing node 145 can determine the distance D according to the equation:

$$D = \sqrt{(D'+d)^2 + d'^2} \tag{14}$$

where D' is the distance between the optical center F of the camera 150 and the line 1110. The distance D' can be measured at the time the camera 150 is installed.

Additionally, the remote computing node 145 can determine the angle θ between a line extending from the camera 150 to the object 1102, i.e., defined by the distance D, and the optical axis, i.e., the line 1108, of the camera 150 based on trigonometric calculations. For example, the remote computing node 145 can determine the angle θ according to the equation:

$$\theta = \arctan\left(\frac{D'+d}{d'}\right) \tag{15}$$

Figure 13:
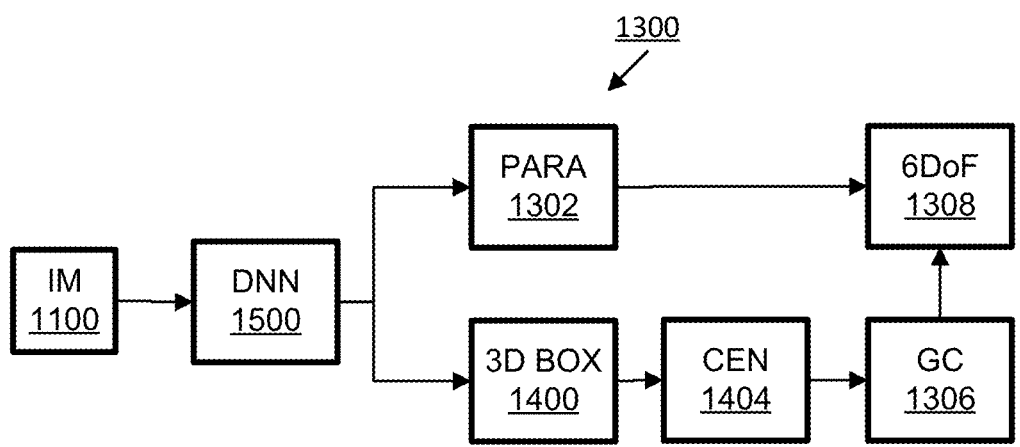
FIG. 13 is a diagram of a pose system that determines a six degree-of-freedom pose of an object from an image including the object.

FIG. 13 is a diagram of a pose system 1300 that determines a six degree-of-freedom (6DoF) pose of an object 1102 from an image 1100 including the object 1102. Six degree-of-freedom refers to the freedom of movement of an object in three-dimensional space (e.g., translation along three perpendicular axes and rotation about each of the three perpendicular axes). A 6DoF pose 1308 of an object 1102 means a location relative to a coordinate system (e.g., a set of coordinates specifying a position in the coordinate system, e.g., X, Y, Z coordinates) and an orientation (e.g., a yaw, a pitch, and a roll) about each axis in the coordinate system. The 6DoF pose 1308 of the object 1102 can be determined in real world coordinates based on orthogonal x, y, and z axes and roll, pitch, and yaw rotations about the x, y, and z axes, respectively. The 6DoF pose 1308 of the object 1102 locates the object with respect to the real world coordinates. Pose system 1300 can be implemented as software operating on the remote computing node 145. In this situation, the remote computing node 145 can determine the 6DoF pose 1308 for the object 1102 and provide the 6DoF pose 1308 for the object 1102 to a computer included in the object 1102, e.g., via the network 135.

The remote computing node 145 can receive the image 1100 from the camera 150 and can input the image 1100 into a neural network, such as a deep neural network (DNN)

1500. (See FIG. 15). The DNN 1500 can be trained to accept the image 1100 as input and generate an output of a 3D bounding box 1400 (see FIG. 14) for an object 1102 included in the image 1100 and object parameters 1302 for the object 1102.

Figure 14:
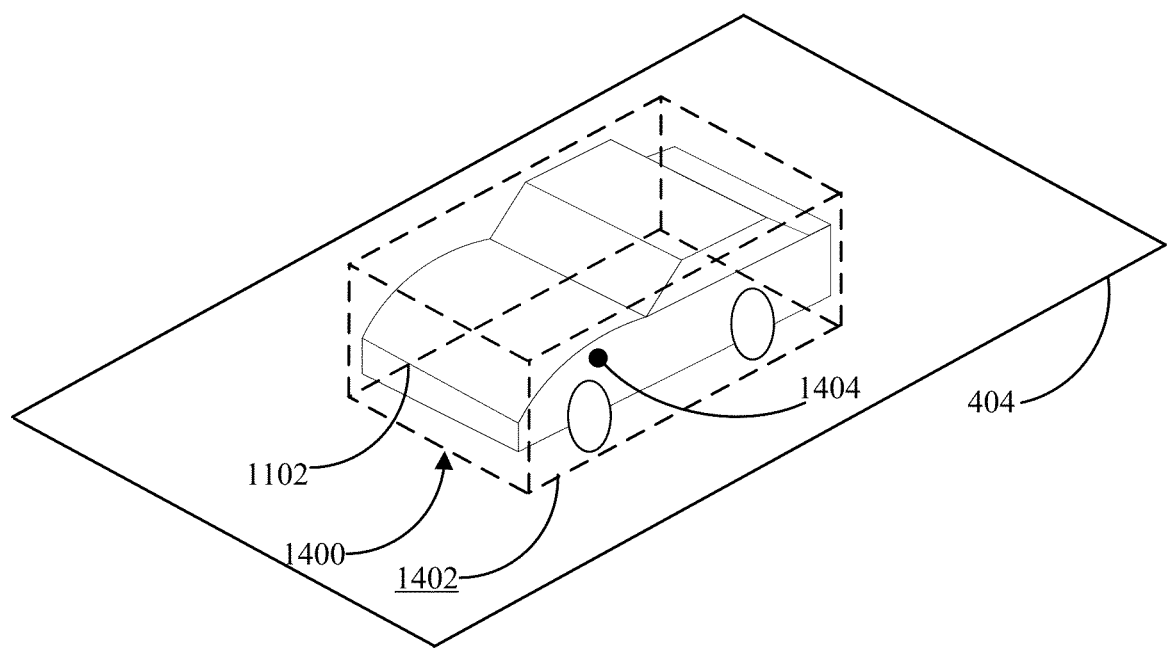
FIG. 14 is a diagram of a three-dimensional bounding box for an object.

FIG. 14 is a diagram of the 3D bounding box 1400 for the object 1102. A "3D bounding box" is a closed boundary defining a set of pixels. For example, the pixels within a bounding box can represent a same object, e.g., a bounding box can define pixels representing an image of an object. Said differently, a bounding box is typically defined as a smallest rectangular prism that includes all of the pixels of the corresponding object. The 3D bounding box 1400 is described by contextual information including a center and eight corners, which are expressed as x, y, and z coordinates in a pixel coordinate system.

The 3D bounding box 1400 includes a bottom face 1402 facing the roadway 210. That is, the bottom face 1402 of the 3D bounding box 1400 extends in the ground plane 404, e.g., along the roadway 210. The bottom face 1402 of the 3D bounding box 1400 is defined by the four lower corners of the 3D bounding box 1400, i.e., lower front right, lower front left, lower rear right, and lower rear left. The bottom face 1402 includes a center 1404.

Returning to FIG. 13, the remote computing node 145 can determine the center 1404 of the bottom face 1402 of the 3D bounding box 1400 relative to the pixel coordinate system. For example, the DNN 1500 may be trained to output the coordinates for the center 1404 of the bottom face 1402 of the 3D bounding box 1400. As another example, the DNN 1500 may be trained to output the eight corners of the 3D bounding box 1400. In such an example, the remote computing node 145 can determine coordinates of the center 1404 of the bottom face 1402 based on respective coordinates for two diagonal corners defining the bottom face 1402 of the 3D bounding box 1400. For example, the remote computing node 145 can determine a midpoint for a line intersecting the two diagonal corners according to the equation:

$$\frac{(x_2 + x_1)}{2}, \frac{(y_2 + y_1)}{2} \qquad (16)$$

where $x_1$, $x_2$ are the x coordinates for the respective corners in the pixel coordinate system, and $y_1$, $y_2$ are the y coordinates for the respective corners in the pixel coordinate system.

As used in this document, "object parameters" are measurable values that describe a physical state of an object. Non-limiting examples of object parameters 1302 include dimensions (e.g., length, width, height), an orientation (e.g., a yaw, a pitch, and a roll about each axis in the pixel coordinate system), a type (e.g., a vehicle, a pedestrian, etc.), and a two-dimensional (2D) bounding box. A 2D bounding box is similar to a 3D bounding box 1400, differing in that the 2D bounding box is typically defined as a smallest rectangular box that includes all of the pixels of the corresponding object. The 2D bounding box is described by contextual information including four corners, which are expressed as x and z coordinates in the pixel coordinate system.

The remote computing node 145 can then determine global coordinates 1306 for the center 1404 based on the distance D and the angle θ. For example, the remote computing node 145 can determine real-world coordinates, relative to a camera coordinate system based on orthogonal x, y, and z axes having respective origins at the camera 150 and roll, pitch, and yaw rotations about the x, y, and z axes, respectively, of the center 1404 of the bottom face 1402 of the 3D bounding box 1400 on the roadway 210. Specifically, the distance D and the angle θ specify coordinates in the x-y plane of the camera coordinate system, and the camera height $h_c$ specifies the coordinates along the z-axis of the camera coordinate system, i.e., from the camera 150 to the ground plane 404.

Upon determining the real-world coordinates of the center 1404 of the bottom face 1402 of the 3D bounding box 1400 relative to the camera 150, the remote computing node 145 can then transform real-world coordinates of the center 1404 of the bottom face 1402 of the 3D bounding box 1400 based on a 6DoF pose of the camera 150. A 6DoF pose of the camera 150 may be stored, e.g., in a memory of the remote computing node 145. The 6DoF pose of the camera 150 may be, for example, manually input by a user. The 6DoF pose of the camera 150 locates the camera 150 with respect to global coordinates. To transform real-world coordinates of the center 1404 of the bottom face 1402 of the 3D bounding box 1400, the remote computing node 145 can combine the real-world coordinates of the center 1404 of the bottom face 1402 of the 3D bounding box 1400 with a transformation offset that specifies a translational difference, e.g., measured in meters, along each of the three orthogonal axes and a rotational difference, e.g., measured in degrees, about each of the three orthogonal axes between the global coordinate system and the camera coordinate system.

Upon determining the global coordinates 1306 of the center 1404 of the bottom face 1402 of the 3D bounding box 1400, the remote computing node 145 can determine the 6DoF pose 1308 for the object 1102 based on the object parameters 1302. For example, the remote computing node 145 can generate a real-world 3D bounding box for the object 1102 based on the object parameters 1302, e.g., dimensions and orientation, output by the DNN 1500.

For example, the remote computing node 145 can determine a lower front right corner of the real-world 3D bounding box 1400 based on i) a first line that is half the length of the object 1102 and extends forward from the global coordinates of the center 1404 of the bottom face 1402 along an x axis of the global coordinate system and at the pitch specified by the orientation and ii) a second line that is half the width of the object 1102 and extends rightward from an end of the first line along the y axis of the global coordinate system and at the yaw specified by the orientation. The coordinates of the lower right front corner are determined from the end of the second line. The other three lower corners can be determined by changing the directionality of at least one of the first line and the second line (e.g., forward to backward and/or leftward to rightward). Coordinates for the four upper corners can be determined by a third line that is the height of the object 1102 and extends upward from a respective lower corner, e.g., along the z axis of the global coordinate system, and at the roll specified by the orientation. Coordinates for the center of the real-world 3D bounding box can be determined by a fourth line that is half the height of the object 1102 and extends upward from the global coordinates of the center 1404 of the bottom face 1402, e.g., along the z axis of the global coordinate system, and at the roll specified by the orientation. The 6DoF pose 1308 for the object 1102 can be determined from the coordinates for the center of the real-world 3D bounding box and the orientation output by the DNN 1500.

Upon determining the 6DoF pose 1308 of the object 1102 with respect to global coordinates, the remote computing node 145 can provide the 6DoF pose 1308 of the object 1102 to a vehicle 105. For example, the remote computing node 145 can transmit the 6DoF pose 1308 of the object 1102 to a vehicle computer 110 in the vehicle 105, e.g., via V-to-I communications. As another example, the remote computing node 145 can transmit the 6DoF pose 1308 of the object 1102 to the remote server computer 140, e.g., via the network 135. In such an example, the remote server computer 140 can then transmit the 6DoF pose 1308 of the object 1102 to the vehicle computer 110, e.g., via the network 135.

A computer in an object can receive, e.g., from a remote computing node 145, the remote server computer 140, etc., respective poses for the object and/or one or more other objects in an environment. The computer in the object can then localize the object relative to the environment. Additionally, or alternatively, the computer in the object can operate the object through the environment while avoiding the other objects. As a non-limiting example, the vehicle computer 110 can receive respective 6DoF poses 1308 for one or more objects 1102 around the vehicle 105. Additionally, or alternatively, the vehicle computer 110 can receive a 6DoF pose of the vehicle 105. Upon receiving the 6DoF pose(s) 1308 for the object(s) 1102 around the vehicle 105 and/or the 6DoF pose for the vehicle 105, the vehicle computer 110 can, for example, generate a path along which to operate the vehicle 105, e.g., a path that avoids the object(s) 1102 around the vehicle 105. The vehicle computer 110 can then actuate one or more vehicle components 125 to operate the vehicle 105 along the path.

A path can be specified according to one or more path polynomials. A path polynomial is a polynomial function of degree three or less that describes the motion of a vehicle on a ground surface. Motion of a vehicle on a roadway is described by a multi-dimensional state vector that includes vehicle location, orientation, speed, and acceleration. Specifically, the vehicle motion vector can include positions in x, y, z, yaw, pitch, roll, yaw rate, pitch rate, roll rate, heading velocity and heading acceleration that can be determined by fitting a polynomial function to successive 2D locations included in the vehicle motion vector with respect to the ground surface, for example.

Further for example, the path polynomial is a model that predicts the path as a line traced by a polynomial equation. The path polynomial predicts the path for a predetermined upcoming distance, by determining a lateral coordinate, e.g., measured in meters:

$$p(x) = a_0 + a_1 x + a_2 x^2 + a_3 x^3 \quad (17)$$

where $a_0$ an offset, i.e., a lateral distance between the path and a center line of the vehicle 105 at the upcoming distance x, $a_1$ is a heading angle of the path, $a_2$ is the curvature of the path, and $a_3$ is the curvature rate of the path.

Figure 15:
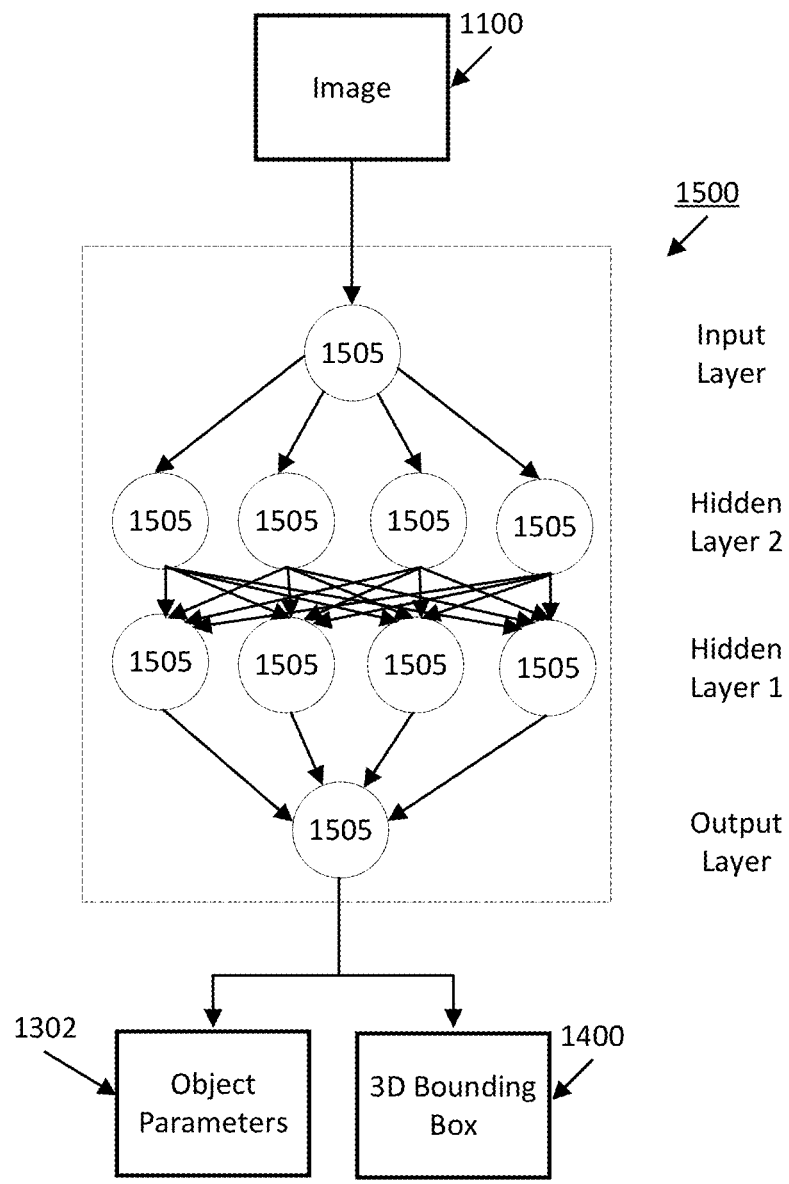
FIG. 15 is an example deep neural network.

FIG. 15 is a diagram of an example deep neural network (DNN) 1500 that can be trained to determine a 3D bounding box 1400 for an object 1102 and object parameters 1302 for the object 1102 based on an image 1100 including the object 1102. The DNN 1500 can be a software program that can be loaded in memory and executed by a processor included in a computer, for example. In an example implementation, the DNN 1500 can include, but is not limited to, a convolutional neural network (CNN), R-CNN (Region-based CNN), Fast R-CNN, and Faster R-CNN. The DNN 1500 includes multiple nodes, and the nodes are arranged so that the DNN 1500 includes an input layer, one or more hidden layers, and an output layer. Each layer of the DNN 1500 can include a plurality of nodes 1505. While FIG. 15 illustrate three hidden layers, it is understood that the DNN 1500 can include additional or fewer hidden layers. The input and output layers may also include more than one node 1505.

The nodes 1505 are sometimes referred to as artificial neurons 1505 because they are designed to emulate biological, e.g., human, neurons. A set of inputs (represented by the arrows) to each neuron 1505 are each multiplied by respective weights. The weighted inputs can then be summed in an input function to provide, possibly adjusted by a bias, a net input. The net input can then be provided to an activation function, which in turn provides a connected neuron 1505 an output. The activation function can be a variety of suitable functions, typically selected based on empirical analysis. As illustrated by the arrows in FIG. 15, neuron 1505 outputs can then be provided for inclusion in a set of inputs to one or more neurons 1505 in a next layer.

As one example, the DNN 1500 can be trained with ground truth data, i.e., data about a real-world condition or state. For example, the DNN 1500 can be trained with ground truth data and/or updated with additional data by a processor of the remote computing node 145. Weights can be initialized by using a Gaussian distribution, for example, and a bias for each node 1505 can be set to zero. Training the DNN 1500 can include updating weights and biases via suitable techniques such as back-propagation with optimizations. Ground truth data used for training can include, but is not limited to, data manually labeled by human operators as specifying object parameters 1302, e.g., dimensions, type, etc.

During operation, the remote computing node 145 obtains an image 1100 including an object 1102 from the camera 150. The remote computing node 145 can provide the image 1100 to the DNN 1500. The DNN 1500 generates an output based on the received input. The output is a determination of a 3D bounding box 1400 for the object 1102 and object parameters 1302 for the object 1102. For example, the DNN 1500 can output object parameters 1302 including, but not limited to, dimensions of the object 1102, a type of object 1102, a 2D bounding box for the object 1102, etc.

Techniques discussed herein for determining a 6DoF pose 1308 of an object 1102 improve existing techniques for determining a pose of an object by using a single monocular camera 150, which can be a video camera. This contrasts with other techniques that require more complex and/or expensive sensors including stereo cameras, lidar or radar sensors. Techniques discussed herein reduce the computational resources required to determine a 6DoF pose 1308 of the object 1102 relative to the camera 150 by using a 3D bounding box 1400 for the object to compute coordinates of a center 1404 of a bottom face 1402 of the 3D bounding box 1400 relative to the camera 150 and thereby permit direct computation of the 6DoF pose 1308 of the object 1102 using the computed coordinates and object parameters 1302 output from the DNN 1500.

Figure 16:
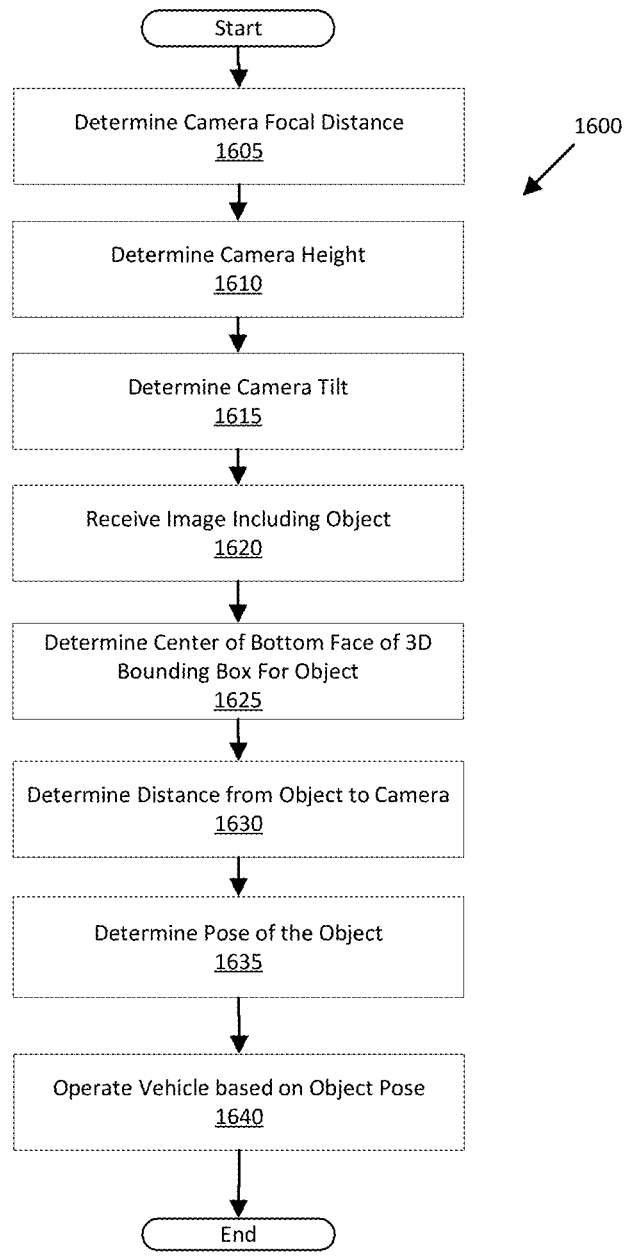
FIG. 16 is a flowchart of an example process for determining a pose of an object.

FIG. 16 is a diagram of an example process 1600 executed in a remote computing node 145 according to program instructions stored in a memory thereof for determining a 6DoF pose 1308 of an object 1102. The remote computing node 145 is included in an object detection system 100 programmed to determine 6DoF poses 1308 of objects 1102 based on image data acquired by sensors, e.g., a camera 150, in variety of systems, including vehicle guidance. Process 1600 includes multiple blocks that can be executed in the illustrated order. Process 1600 could alternatively or additionally include fewer blocks or can include the blocks executed in different orders.

Process 1600 begins at block 1605. In the block 1605, the remote computing node 145 determines camera 150 intrinsic parameters, including camera focal distance $f_p$, for a camera 150 based on a calibration image 800 including a calibration pattern 802. The remote computing node 145 can determine the camera 150 intrinsic parameters by processing the calibration image 800 using the MatLab camera calibration application discussed above in relation to FIG. 8. The process 1600 continues in a block 1610.

In the block 1610, the remote computing node 145 determines a camera height $h_c$ for the camera 150 by processing camera 150 extrinsic parameters output by the MatLab camera calibration application as discussed above in relation to FIG. 9. Camera 150 is a stationary camera set to view a traffic scene 200 from a "bird's eye view" position, where the camera 150 looks down on a roadway 210 and can acquire images 1100 that include objects 1102 including vehicles. The process 1600 continues in a block 1615.

In the block 1615, the remote computing node determines a camera tilt ß for the camera 150 by processing camera 150 extrinsic parameters output by the MatLab camera calibration application as discussed above in relation to FIG. 10. Camera tilt ß is the angle at which the camera 150 looks down upon the roadway 210. The process 1600 continues in a block 1620.

In the block 1620, the remote computing node 145 receives an image 1100 of the roadway 210 from the camera 150. The image 1100 includes measuring fiducials 1112 coincident with a line 1110 that corresponds to a bottom boundary of the image 1100. The measuring fiducials 1112 are used to determine a second distance d' between a line 1108 formed by the optical axis of camera 150 and a line 1106 between a vanishing point $x_\infty'$ and the point $x_1'$ where the line 1106 intersects the line 1110, as discussed above in relation to FIG. 11. The process 1600 continues in a block 1625.

In the block 1625, the remote computing node 145 determines a center 1404 of a bottom face 1402 of a 3D bounding box 1400 for an object 1102 included in the image 1100. The remote computing node 145 can input the image 1100 into a DNN 1500 that is trained to output the 3D bounding box 1400 for the object 1102 and object parameters 1302, as discussed above. The remote computing node 145 can then determine pixel coordinates for the center 1404 of the bottom face 1402 of the 3D bounding box 1400, as discussed above in relation to FIG. 13. The process 1600 continues in a block 1630.

In the block 1630, the remote computing node 145 determines a distance D from the camera 150 focal point F to the center 1404 of the bottom face 1402 of the 3D bounding box 1400 for the object 1102 using cross-ratio invariance and camera calibration processing applied to traffic data. A camera calibration constant τ is determined based on the focal distance $f_p$, the camera height $h_c$, and camera tilt β according to equation (12). The camera calibration constant τ is used to determine a first distance d between points $x_1''$, $x_2''$ in image 1100, i.e., the center 1404 of the bottom face 1402 of the 3D bounding box 1400 and the intersection between the lines 1106 and 1110, which can be processed using measuring fiducials 1112 and equation (13) as discussed above in relation to FIG. 11. The remote computing node 145 can then determine the distance D based on the first distance d and the second distance d', as discussed above in relation to FIG. 12. Additionally, the remote computing node 145 determines an angle θ between the optical axis of the camera 150, i.e., line 1108, and the line 1106, as discussed above in relation to FIG. 12. The process 1600 continues in a block 1635.

In the block 1635, the remote computing node 145 determines a 6DoF pose 1308 of the object 1102 based on the distance D, the angle θ, and the object parameters 1302, as discussed above. The 6DoF pose 1308 of the object 1102 locates the object 1102 with respect to the global coordinate system. Upon determining the 6DoF pose 1308 of the object 1102, the remote computing node 145 can provide the 6DoF pose 1308 of the object 1102 to a vehicle 105 (or a remote server computer 140), as discussed above. The process 1600 continues in a block 1640.

In the block 1640, a vehicle computer 110 operates the vehicle 105 based on the received 6DoF pose 1308 of the object 1102. The vehicle computer 110 can use 6DoF pose 1308 of the object 1102 to determine a vehicle 105 path upon which to operate the vehicle 105. In an example in which the object 1102 is the vehicle 105, the vehicle computer 110 can determine a vehicle 105 path based on the received 6DoF pose 1308 of the vehicle 105. In an example in which the object 1105 is not the vehicle 105, the vehicle computer 110 can determine a vehicle 105 path that avoids contact or near-contact with the object 1102 based on polynomial functions that maintain limits of lateral and longitudinal accelerations by the vehicle 105 while operating. The process 1600 ends following the block 1640.

As used herein, the adverb "substantially" means that a shape, structure, measurement, quantity, time, etc. may deviate from an exact described geometry, distance, measurement, quantity, time, etc., because of imperfections in materials, machining, manufacturing, transmission of data, computational speed, etc.

In general, the computing systems and/or devices described may employ any of a number of computer operating systems, including, but by no means limited to, versions and/or varieties of the Ford Sync® application, AppLink/Smart Device Link middleware, the Microsoft Automotive® operating system, the Microsoft Windows® operating system, the Unix operating system (e.g., the Solaris® operating system distributed by Oracle Corporation of Redwood Shores, California), the AIX UNIX operating system distributed by International Business Machines of Armonk, New York, the Linux operating system, the Mac OSX and iOS operating systems distributed by Apple Inc. of Cupertino, California, the BlackBerry OS distributed by Blackberry, Ltd. of Waterloo, Canada, and the Android operating system developed by Google, Inc. and the Open Handset Alliance, or the QNX® CAR Platform for Infotainment offered by QNX Software Systems. Examples of computing devices include, without limitation, an on-board first computer, a computer workstation, a server, a desktop, notebook, laptop, or handheld computer, or some other computing system and/or device.

Computers and computing devices generally include computer-executable instructions, where the instructions may be executable by one or more computing devices such as those listed above. Computer executable instructions may be compiled or interpreted from computer programs created using a variety of programming languages and/or technologies, including, without limitation, and either alone or in combination, Java™, C, C++, Matlab, Simulink, Stateflow, Visual Basic, Java Script, Perl, HTML, etc. Some of these applications may be compiled and executed on a virtual machine, such as the Java Virtual Machine, the Dalvik virtual machine, or the like. In general, a processor (e.g., a microprocessor) receives instructions, e.g., from a memory, a computer readable medium, etc., and executes these instructions, thereby performing one or more processes, including one or more of the processes described herein. Such instructions and other data may be stored and transmitted using a variety of computer readable media. A file in a computing device is generally a collection of data stored on a computer readable medium, such as a storage medium, a random access memory, etc.

Memory may include a computer-readable medium (also referred to as a processor-readable medium) that includes any non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random access memory (DRAM), which typically constitutes a main memory. Such instructions may be transmitted by one or more transmission media, including coaxial cables, copper wire and fiber optics, including the wires that comprise a system bus coupled to a processor of an ECU. Common forms of computer-readable media include, for example, RAM, a PROM, an EPROM, a FLASH-EEPROM, any other memory chip or cartridge, or any other medium from which a computer can read.

Databases, data repositories or other data stores described herein may include various kinds of mechanisms for storing, accessing, and retrieving various kinds of data, including a hierarchical database, a set of files in a file system, an application database in a proprietary format, a relational database management system (RDBMS), etc. Each such data store is generally included within a computing device employing a computer operating system such as one of those mentioned above, and are accessed via a network in any one or more of a variety of manners. A file system may be accessible from a computer operating system, and may include files stored in various formats. An RDBMS generally employs the Structured Query Language (SQL) in addition to a language for creating, storing, editing, and executing stored procedures, such as the PL/SQL language mentioned above.

In some examples, system elements may be implemented as computer-readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein.

With regard to the media, processes, systems, methods, heuristics, etc. described herein, it should be understood that, although the steps of such processes, etc. have been described as occurring according to a certain ordered sequence, such processes may be practiced with the described steps performed in an order other than the order described herein. It further should be understood that certain steps may be performed simultaneously, that other steps may be added, or that certain steps described herein may be omitted. In other words, the descriptions of processes herein are provided for the purpose of illustrating certain embodiments and should in no way be construed so as to limit the claims.

Accordingly, it is to be understood that the above description is intended to be illustrative and not restrictive. Many embodiments and applications other than the examples provided would be apparent to those of skill in the art upon reading the above description. The scope of the invention should be determined, not with reference to the above description, but should instead be determined with reference to the appended claims, along with the full scope of equivalents to which such claims are entitled. It is anticipated and intended that future developments will occur in the arts discussed herein, and that the disclosed systems and methods will be incorporated into such future embodiments. In sum, it should be understood that the invention is capable of modification and variation and is limited only by the following claims.

All terms used in the claims are intended to be given their plain and ordinary meanings as understood by those skilled in the art unless an explicit indication to the contrary in made herein. In particular, use of the singular articles such as "a," "the," "said," etc. should be read to recite one or more of the indicated elements unless a claim recites an explicit limitation to the contrary.

The invention claimed is:

1. A system, comprising:
   a camera positioned to obtain an image of an object; and
   a computer including a processor and a memory, the memory storing instructions executable by the processor to:
   input the image to a neural network that outputs a three-dimensional (3D) bounding box for the object relative to a pixel coordinate system and object parameters;
   then determine a center of a bottom face of the 3D bounding box in pixel coordinates, wherein the bottom face of the 3D bounding box is located in a ground plane in the image;
   upon determining an intersection between a first line extending through a vanishing point for the camera and the center of the bottom face and a second line extending along a bottom boundary of the image, determine a first distance, relative to the real-world coordinate system, from the center of the bottom face to the intersection;
   determine a second distance, relative to the real-world coordinate system, from the intersection to the optical axis of the camera;
   based on calibration parameters for the camera that transform pixel coordinates into real-world coordinates and the first and second distances, determine a) a distance from the center of the bottom face of the 3D bounding box to the camera relative to a real-world coordinate system and b) an angle between a line extending from the camera to the center of the bottom face of the 3D bounding box and an optical axis of the camera, wherein the calibration parameters include a camera height relative to the ground plane, a camera focal distance, and a camera tilt relative to the ground plane; and
   determine a six degree-of-freedom (6DoF) pose for the object based on the object parameters, the distance, and the angle.

2. The system of claim 1, wherein the instructions further include instructions to determine the first distance based on a distance, in pixels, from the vanishing point to the center of the bottom face, a distance, in pixels, from the vanishing point to the intersection, and the calibration parameters.

3. The system of claim 2, wherein the instructions further include instructions to determine the first distance based additionally on a projection angle between the optical axis of the camera and the first line.

4. The system of claim 1, wherein the instructions further include instructions to determine the second distance based on pixel coordinates of the intersection and measuring fiducials.

5. The system of claim 1, wherein the instructions further include instructions to determine the calibration parameters based on a calibration image including a calibration pattern located parallel to and coincident with the ground plane.

6. The system of claim 1, wherein the 6DoF pose is determined in coordinates of the real-world coordinate system based on orthogonal x, y, and z axes and roll, pitch, and yaw rotations about the x, y, and z axes, respectively.

7. The system of claim 1, wherein the object parameters include at least one of dimensions, a two-dimensional bounding box, and an orientation relative to the camera.

8. The system of claim 1, wherein the computer and the camera are remote from a vehicle, wherein the instructions further include instructions to provide the 6DoF pose for the object to a second computer in the vehicle.

9. The system of claim 8, further comprising the second computer including a second processor and a second memory, the second memory storing instructions executable by the second processor to operate the vehicle based on the 6DoF pose for the object.

10. The system of claim 8, wherein the object is the vehicle.

11. The system of claim 1, wherein the instructions further include instructions to determine the 6DoF pose for the object based additionally on a 6DoF pose of the camera.

12. A method, comprising:
 obtaining, via a camera, an image including an object;
 inputting, via a computer, an image to a neural network that outputs a three-dimensional (3D) bounding box for the object relative to a pixel coordinate method and object parameters;
 then determining a center of a bottom face of the 3D bounding box in pixel coordinates, wherein the bottom face of the 3D bounding box is located in a ground plane in the image;
 upon determining an intersection between a first line extending through a vanishing point for the camera and the center of the bottom face and a second line extending along a bottom boundary of the image, determining a first distance, relative to the real-world coordinate system, from the center of the bottom face to the intersection;
 determining a second distance, relative to the real-world coordinate system, from the intersection to the optical axis of the camera;
 based on calibration parameters for the camera that transform pixel coordinates into real-world coordinates and the first and second distances, determining a) a distance from the center of the bottom face of the 3D bounding box to the camera relative to a real-world coordinate method and b) an angle between a line extending from the camera to the center of the bottom face of the 3D bounding box and an optical axis of the camera, wherein the calibration parameters include a camera height relative to the ground plane, a camera focal distance, and a camera tilt relative to the ground plane; and
 determining a six degree-of-freedom (6DoF) pose for the object based on the object parameters, the distance, and the angle.

13. The method of claim 12, further comprising determining the first distance based on a distance, in pixels, from the vanishing point to the center of the bottom face, a distance, in pixels, from the vanishing point to the intersection, and the calibration parameters.

14. The method of claim 13, further comprising determining the first distance based additionally on a projection angle between the optical axis of the camera and the first line.

15. The method of claim 12, further comprising determining the second distance based on pixel coordinates of the intersection and measuring fiducials.

16. The method of claim 12, further comprising determining the calibration parameters based on a calibration image including a calibration pattern located parallel to and coincident with the ground plane.

17. The method of claim 12, wherein the computer and the camera are remote from a vehicle, further comprising providing the 6DoF pose for the object to a second computer in the vehicle.

18. The method of claim 17, further comprising operating, at the second computer, the vehicle based on the 6DoF pose for the object.

19. The method of claim 17, wherein the object is the vehicle.

20. The method of claim 12, further comprising determining the 6DoF pose for the object based additionally on a 6DoF pose of the camera.

* * * * *